(12) United States Patent
Aoyama

(10) Patent No.: US 8,452,120 B2
(45) Date of Patent: *May 28, 2013

(54) IMAGE PROCESSING DEVICE AND METHOD

(75) Inventor: Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 564 days.

This patent is subject to a terminal disclaimer.

(21) Appl. No.: 12/716,078

(22) Filed: Mar. 2, 2010

(65) Prior Publication Data

US 2010/0231798 A1 Sep. 16, 2010

(30) Foreign Application Priority Data

Mar. 11, 2009 (JP) ................ P2009-057940

(51) Int. Cl.
G06K 9/40 (2006.01)
(52) U.S. Cl.
USPC .......................... 382/266; 382/241
(58) Field of Classification Search
None
See application file for complete search history.

(56) References Cited

U.S. PATENT DOCUMENTS

| 6,748,113 | B1 | 6/2004 | Kondo et al. | |
| 7,054,500 | B1 | 5/2006 | Lillevold | |
| 2005/0249426 | A1* | 11/2005 | Badawy | 382/241 |
| 2007/0104385 | A1* | 5/2007 | Kobayashi et al. | 382/266 |
| 2007/0250893 | A1 | 10/2007 | Akiyama et al. | |

FOREIGN PATENT DOCUMENTS

| EP | 0 859 518 A1 | 8/1988 |
| EP | 0 917 357 A1 | 5/1996 |
| EP | 1 641 270 A1 | 3/2006 |
| JP | 2001-204029 | 7/2001 |
| JP | 2005-012641 | 1/2005 |
| JP | 2005-079617 | 3/2005 |
| JP | 2006-157238 | 6/2006 |
| JP | 2007-266684 | 10/2007 |
| JP | 2007-281542 | 10/2007 |
| WO | WO 2005/004489 | 1/2005 |

OTHER PUBLICATIONS

English-language European Search Report in corresponding European Application No. 10 15 5448, mailed Aug. 6, 2012.
English-language Communcation pursuant to Article 94. (3) EPC in corresponding European Application No. 10 155 448.3. mailed Sep. 7, 2012.
Puri A et al.; "Video Coding Using The H.264/MPEG-4 AVC Compression Standard", Signal Processing, Image Communication, Elsevier Science Publishers, Amsterdam, NL, vol. 19, No. 9, pp. 793-849, Oct. 1, 2004.
English-language Communication pursuant to Article 97.(3) EPC in corresponding EP 09 00 3496.8, mailed Sep. 7, 2012.
English-language European Search Report in corresponding European Application No. 09 00 3496, mailed Aug. 6, 2012.

* cited by examiner

Primary Examiner — Sath V Perungavoor
Assistant Examiner — Dakshesh Parikh
(74) Attorney, Agent, or Firm — Finnegan, Henderson, Farabow, Garrett & Dunner LLP

(57) ABSTRACT

An image processing device includes: a level difference calculation means for calculating the difference of pixel values between each pixel and a neighborhood pixel as a level difference; a classification means for classifying respective pixels into classes in each range of the level difference; a boundary proportion calculation means for calculating proportion of the number of pixels at a block boundary as a boundary proportion according to the respective classes; and a block noise intensity determination means for determining a level difference of the class in which the boundary proportion is higher than a given threshold as well as the maximum value as block noise intensity in the image.

13 Claims, 29 Drawing Sheets

FIG.17

| id | table |
|---|---|
| 0 | 0 |
| 1 | 4 |
| 2 | 8 |
| 3 | 12 |
| 4 | 16 |
| 5 | 20 |
| 6 | 24 |
| 7 | 28 |

FIG.18

| id | b_hist | t_hist | | b_hist/t_hist × 100(%) | t_hist [id] /total × 100(%) |
|---|---|---|---|---|---|
| 0 | 300 | 1000 | | 30 | 54 |
| 1 | 150 | 400 | | 38 | 22 |
| 2 | 45 | 200 | | 23 | 11 |
| 3 | 18 | 110 | | 16 | 6 |
| 4 | 15 | 50 | | 30 | 3 |
| 5 | 10 | 60 | | 17 | 3 |
| 6 | 2 | 20 | | 10 | 1 |
| 7 | 1 | 10 | | 10 | 1 |
| total | | 1840 | | 0 | 100 |

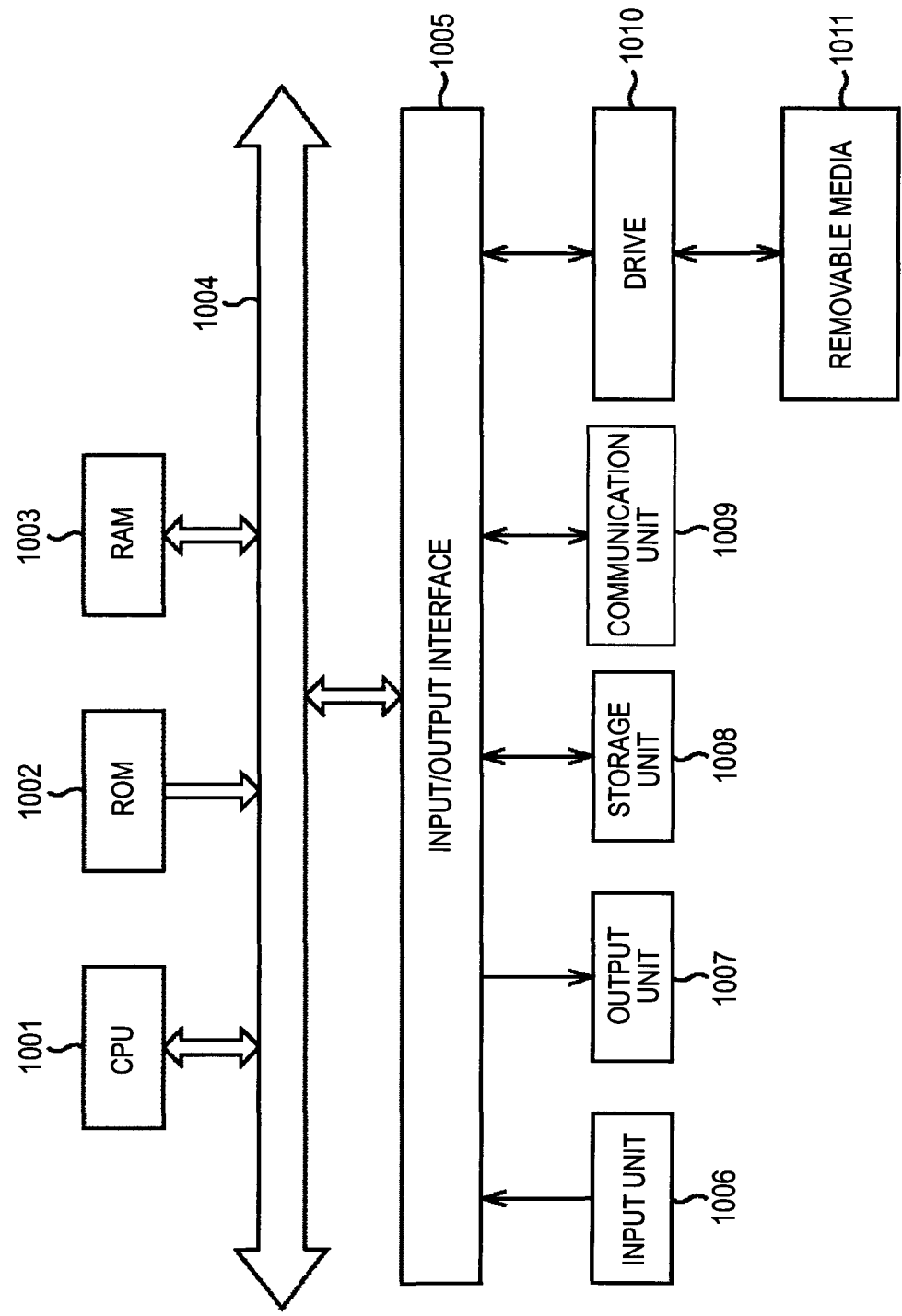

IMAGE PROCESSING DEVICE AND METHOD

BACKGROUND OF THE INVENTION

1. Field of the Invention

The present invention relates to an image processing device and a method thereof, and particularly relates to an image processing device and a method capable of measuring block noise intensity.

2. Description of the Related Art

It is known that, when encoded image data is decoded, noise is generated on a decoded image.

For example, when image data is compressed by compression methods such as a MPEG (Moving Picture Experts Group) system, an encoder divides the image data into rectangular blocks having the plural number of pixels and performs DCT (Discrete Cosine Transform) processing on the respective divided blocks.

Accordingly, when a decoder decodes image data which has been encoded by the MPEG system, level differences occur in pixel values between pixels at boundaries of respective blocks and block noise tends to occur in the decoded image data in principle.

A device for reducing or removing such block noise is generally realized by applying an LPF (Low Pass Filter) set to a known block size (for example, 8×8 pixel in the case of MPEG2) and a block boundary position to perform smoothing.

However, in the above simple method, there are problems that image information is lost due to blur or that block distortion newly occurs by applying the smoothing only at block boundaries.

The degree and intensity of block noise largely differ depending on image contents or conditions of the compressed encoding (for example, bit rate or quantization scale), therefore, there are problems that reduction is not effective in uniform block noise reduction processing when the block noise intensity is strong, or that adverse effects occur due to the loss of image information when the block noise is extremely low.

In order to avoid these problems, various devices and methods have been proposed until now.

However, an image signal on which scaling (resolution conversion/pixel-number conversion) has been performed on the side of a video output device such as a DVD (Digital Versatile Disk) player may be inputted on the side of a television receiver, therefore, it is necessary to comply with the size different from the block size (for example, 8×8 pixel) which is prescribed in the MPEG standards.

That is, part of such players include a function of performing scaling, therefore, even when a recorded signal is a signal having SD (Standard Definition) resolution such as 720×480 pixel, the signal may be outputted after converted into a signal having HD (High Definition) resolution of 1920×1080 pixel which is output resolution.

Additionally, even when the recorded signal is the HD signal, there exist a signal having 1440×1080 pixel resolution, and such signal may be outputted after converted into the HD resolution of 1920×1080 pixel.

As described above, quality of the digital-decoded signal largely differs due to effects by scaling and system difference, that is, whether input video is analog input or digital input (distortion is sometimes large and sometimes small).

The quality of the decoded image largely varies from low quality to high quality due to the difference of the encoding system and conditions at the time of compressed encoding such as bit rate as well as the image type (distortion tends to be increased at the time of active moving pictures or images having complicated image information even in the case of still images).

Accordingly, the noise reduction processing is efficiently applied to images ranging from low quality to high quality by estimating quality of the compression decoding image and by dynamically switching intensity of the noise reduction processing according to the estimated amount (refer to JP-A-2001-204029 (Patent Document 1) and JP-A-2007-281542 (Patent Document 2)).

SUMMARY OF THE INVENTION

However, the techniques disclosed in Patent Documents 1, 2 are effective when compressed encoding information can be acquired, however, the compressed encoding information is not always obtained particularly in the television receiver because there are input images from external devices, therefore, it is difficult to perform dynamic control.

In view of the above, it is desirable to adaptively reduce block noise with respect to an input image by statistically measuring block noise intensity from the entire image decoded to thereby change the intensity of block noise reduction processing so as to correspond to the measured block noise intensity.

According to an embodiment of the invention, there is provided an image processing device including a level difference calculation means for calculating the difference of pixel values between each pixel and a neighborhood pixel as a level difference, a classification means for classifying respective pixels into classes in each range of the level difference, a boundary proportion calculation means for calculating proportion of the number of pixels at a block boundary as a boundary proportion according to the respective classes and a block noise intensity determination means for determining a level difference of the class in which the boundary proportion is higher than a given threshold and is the maximum value as block noise intensity in the image.

The image processing device may further include a stabilization means for correcting and stabilizing block noise intensity in an image including a current target pixel by block noise intensity of a temporally-close pixel when the image belongs to moving pictures.

The image processing device may further include a motion amount calculation means for calculating the motion amount of the image based on the sum of absolute differences in respective pixels between frames of the image, in which the stabilization means may include a reaction sensitivity adjustment means for adjusting reaction sensitivity of intensity change in block noise intensity in the image including the current target pixel and block noise intensity of the temporally-close image based on the motion amount calculated by the motion amount calculation means, which can stabilize block noise intensity in the image including the current target pixel by the intensity change in which reaction sensitivity has been adjusted by the reaction sensitivity adjustment means and the block noise intensity of the temporally-close image.

The reaction sensitivity adjustment means may adjust the reaction sensitivity by a function of adjusting the degree of change in a change direction of the intensity change.

The reaction sensitivity adjustment means may adjust the reaction sensitivity to be high for a period of time from a point when the motion amount calculated by the motion amount calculation means becomes higher than a given value until a given period of time has elapsed.

The image may be an image belonging to pictures encoded in MPEG (Moving Picture Experts Group) system, in which the reaction sensitivity adjustment means may adjust the reaction sensitivity of intensity change in block noise intensity of a frame included in GOP (Group of Pictures) which is a unit of the image in accordance with time necessary for decoding processing of the GOP.

The motion amount calculation means may determine the number of pixels in which the sum of absolute differences is larger than a given threshold between frames of the image as the motion amount of the image.

The level difference calculation means may calculate a difference value between absolute difference of pixel values between a target pixel and a reference pixel in the vicinity of the target pixel and absolute difference of pixel values between a neighborhood pixel in the vicinity of the target pixel and a reference pixel in the vicinity of the neighborhood pixel as a difference value of the target pixel, and may determine the difference value of the target pixel as level difference of the target pixel when the difference value of the target pixel is larger than a given value.

The level difference calculation means may further include a storage means for storing plural information of difference values of the target pixel, and when the difference value in the target pixel is the maximum value in plural difference values of the target pixel stored in the storage means, may determines the difference value as level difference of the target pixel.

The level difference calculation means may change the reference value based on the block size.

The boundary proportion calculation means may calculate proportion of the number of pixels at a block boundary in the each class in the descending order of corresponding level differences.

The image processing device may further include a total proportion calculation means for calculating proportion in each class with respect to pixels of the whole image as a total proportion, in which, when the total proportion is smaller than another given threshold which is lower than the given threshold, the boundary proportion calculation means can stop calculation of the total proportion of classes having corresponding level differences larger than the class.

According to another embodiment of the invention, there is provided an image processing method including the steps of calculating the difference of pixel values between each pixel and a neighborhood pixel as a level difference, classifying respective pixels into classes in each range of the level difference, calculating proportion of the number of pixels at a block boundary as a boundary proportion according to the respective classes, and determining a level difference of the class in which the boundary proportion is higher than a given threshold and is the maximum value as block noise intensity in the image.

According to the embodiments of the invention, the difference of pixel values between each pixel in the image and a neighborhood pixel is calculated as level difference, respective pixels are classified into classes according to the range of the level difference, proportion of the number of pixels at the block boundary is calculated according to the respective classes, and the level difference of the class in which the boundary proportion is higher than a given threshold and is the maximum value is determined as block noise intensity.

According to the embodiments of the invention, intensity of block noise generated when encoded image data is decoded can be measured.

BRIEF DESCRIPTION OF THE DRAWINGS

FIG. 17 is a chart explaining statistical processing;

FIG. 18 is a chart explaining statistical processing;

FIG. 32 is a view explaining a configuration example of a general-purpose personal computer.

DESCRIPTION OF THE PREFERRED EMBODIMENTS

Figure 1:
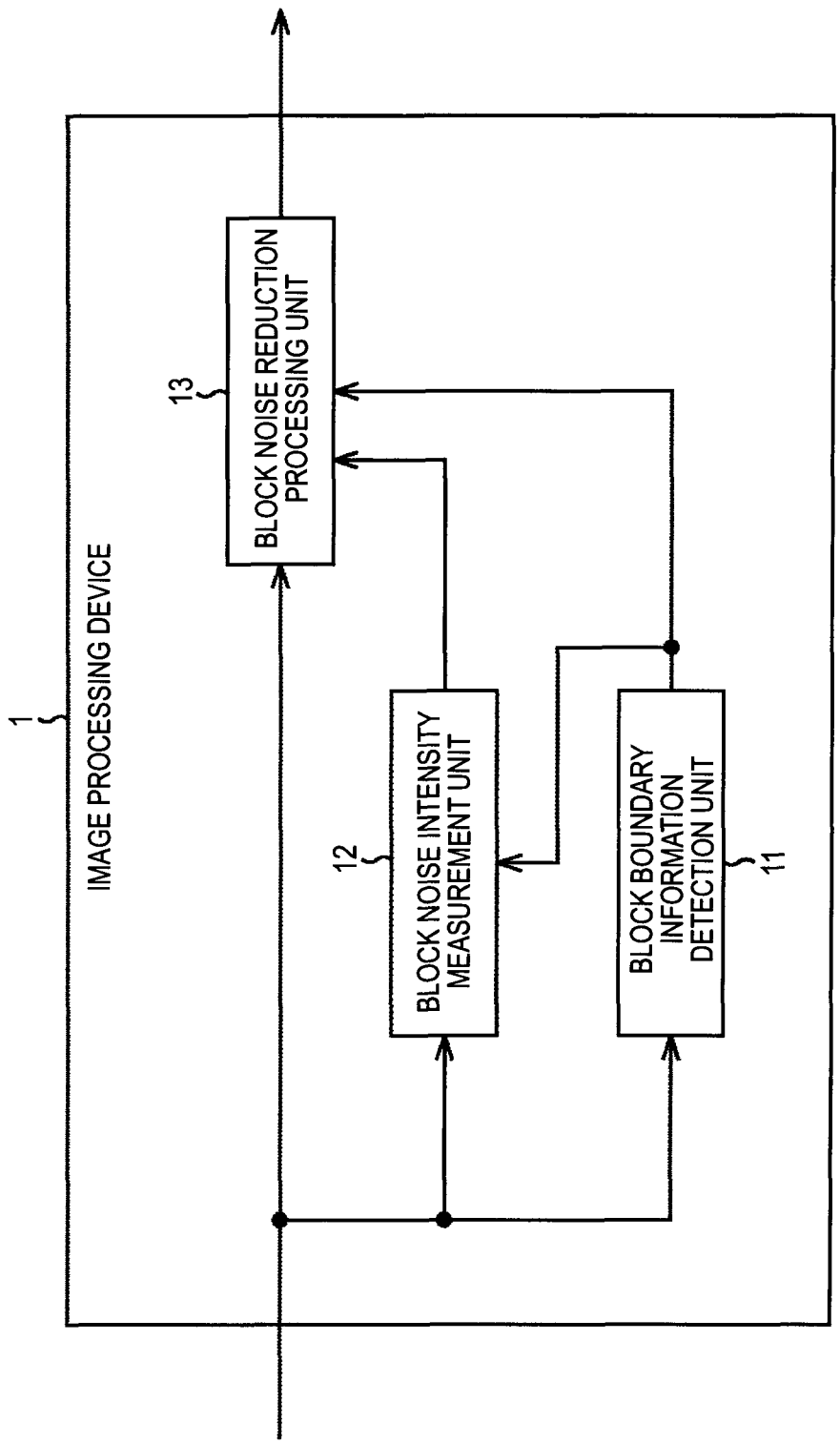
FIG. 1 is a block diagram explaining an image processing device according to an embodiment to which the invention is applied.

FIG. 1 is a block diagram showing a configuration example of an image processing device according to an embodiment to which the invention is applied.

An image processing device 1 of FIG. 1 includes a block boundary information detection unit 11, a block noise intensity measurement unit 12 and a block noise reduction processing unit 13, which controls the intensity of noise reduction processing at block boundaries based on intensity of block noise of an inputted image and outputs a block-noise reduction processed image in which block noise has been reduced.

Images to be inputted to the image processing device 1 includes, for example, an image read from storage media such as a DVD (Digital Versatile Disc) or an HDD (Hard Disc Drive), decoded and outputted by a player and the like.

Part of such players have an image scaling function, which can convert recorded image data having SD (Standard Definition) resolution of 720×480 pixel into image data having HD (Hi Definition) resolution of 1920×1080 pixel and output the image data. When a recorded signal is an HD signal, there exist a signal having 1440×1080 pixel resolution, and part of players can convert image data of an image B into an image C having the HD resolution of 1920×1080 pixel and output the image.

Accordingly, images to be inputted into the image processing device 1 can be image data in which an analog signal has been digitally converted, image data including the digital signal or image data an image resolution of which has been converted (scaled) with respect to the analog signal or original image data having any of the above resolution.

The block boundary information detection unit 11 detects a block size which is a unit to be subject to DCT (Discrete Cosine Transform) process and a block boundary position in an encoded state before decoding from the inputted image, supplying respective information to the block noise intensity measurement unit 12 and the block noise reduction processing unit 13 as information of block size information and information of the block boundary position. When the block size and the block boundary position are previously known by means such as communication with respect to a decoder, the block boundary information detection unit 11 selects the known block size and the block boundary position information without performing detection and supplies the information to the block noise reduction processing unit 13.

The block noise intensity measurement unit 12 measures the block noise intensity of the inputted image based on the information of the block size and the block boundary position supplied from the block boundary information detection unit 11, supplying information of the measured block noise intensity to the block noise reduction processing unit 13.

The block noise reduction processing unit 13 reduces block noise by adaptively changing the intensity of block noise reduction processing based on information of the block size and the block boundary position supplied from the block boundary information detection unit 11 as well as information of block noise intensity supplied from the block noise intensity measurement unit 12, outputting the block-noise reduction processed image in which the block noise has been reduced.

Next, a configuration example of the block noise intensity measurement unit 12 in the embodiment will be explained with reference to FIG. 2.

A block-level difference information acquisition unit 31 calculates absolute differences of pixel values between respective pixels as target pixels and reference pixels corresponding to these target pixels from the input image based on the block size and the block boundary position, determining whether the level difference occurs or not by comparing with peripheral pixels as well as storing the absolute differences in a level difference information buffer 32 as information of level difference.

A statistical processing unit 33 statistically performs information of level difference stored in the level difference information buffer 32 to thereby calculate the intensity of block noise in the input image and supplies the intensity to a stabilization processing unit 34.

The stabilization processing unit 34 calculates a change direction based on information of block noise intensity of the input image and information of block noise intensity of an immediately preceding input image, corrects the block noise intensity of the input image to be stabilized corresponding to the change direction and supplies the corrected result to the block noise reduction processing unit 13 as block noise intensity.

Figure 3:
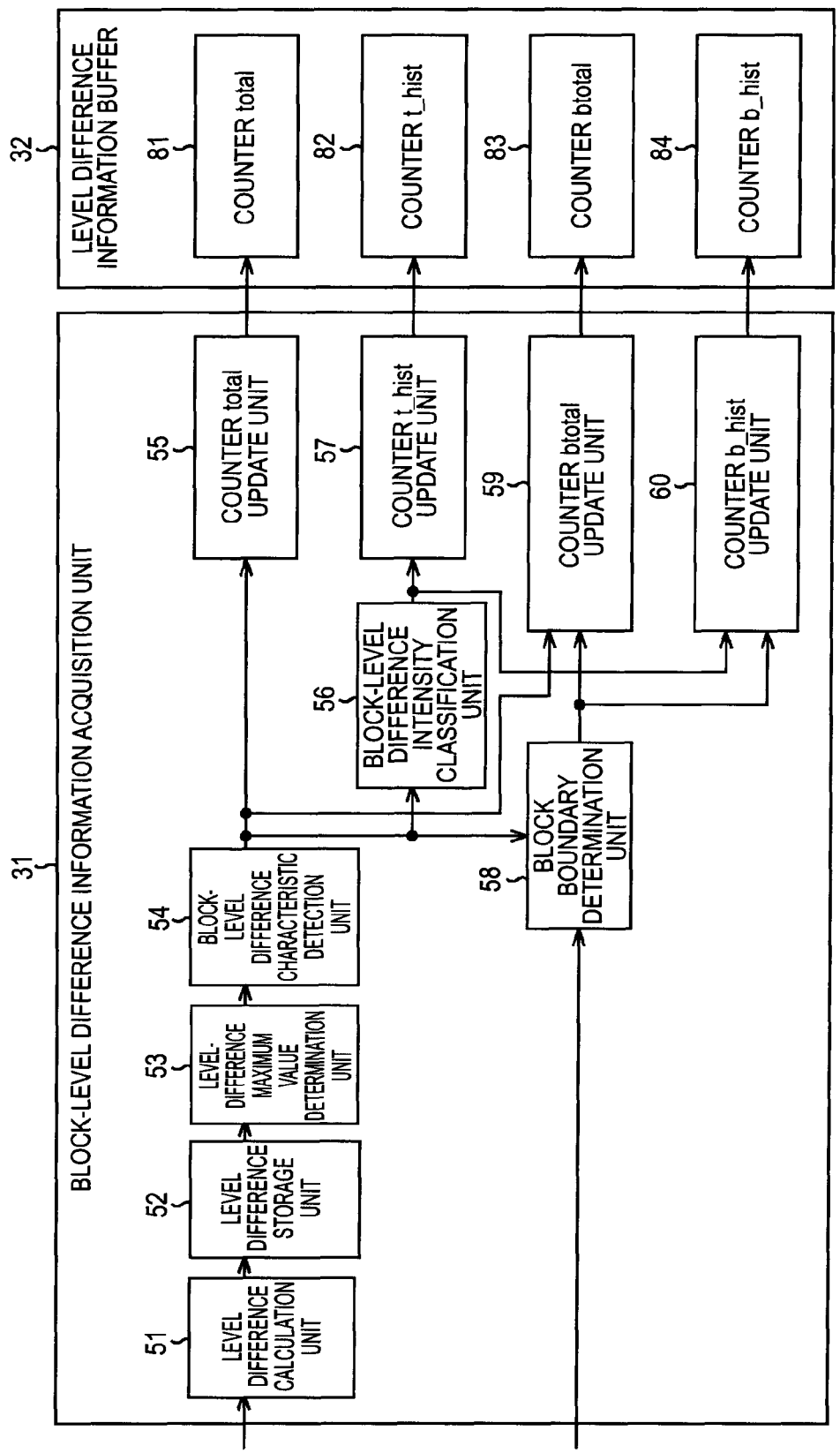
FIG. 3 is a block diagram explaining a configuration example of a block-level difference information acquisition unit of FIG. 2.

Next, a configuration example of the block-level difference information acquisition unit 31 in the embodiment will be explained with reference to FIG. 3.

A level difference calculation unit 51 calculates, with respect to the target pixel and reference pixels in the vicinity of the target pixel in the input image, absolute differences of pixel values between respective adjacent pixels as level differences, storing the calculated result in a level difference storage unit 52.

A level-difference maximum value determination unit 53 determines whether the absolute difference of pixel values between the target pixel of the input image and the adjacent pixel is the maximum value when including absolute differences of pixel values between reference pixels and adjacent pixels. When the value is the maximum, the level-difference maximum value determination unit 53 supplies the level difference to a block-level difference characteristic detection unit 54 as a block boundary level difference, and when the value is not the maximum, the level-difference maximum value determination unit 53 notifies the block-level difference characteristic detection unit 54, of the block level difference as "0" indicating that it is not the block boundary level difference.

When the supplied level difference is larger than "0", the block-level difference characteristic detection unit 54 supplies the level difference to a counter "total" update unit 55, a block-level difference intensity classification unit 56, a block boundary determination unit 58 and a counter "btotal" update unit 59 as a block level difference. When the supplied level difference is not larger than "0", the block-level difference characteristic detection unit 54 supplies the level difference as "0" to the counter "total" update unit 55, the block-level difference intensity classification unit 56, the block boundary determination unit 58 and the counter "btotal" update unit 59.

When the block level difference is supplied from the block-level difference characteristic detection unit 54, the counter "total" update unit 55 increments a BN intensity total counter "total" 81 which is stored in the level difference information buffer 32 by 1 and updates the counter. That is, the BN intensity total counter "total" 81 counts the processed total number of pixels.

The block-level difference intensity classification unit 56 classifies, based on the information of the block-level difference, the intensity of the block level differences into classes according to the block noise intensity, which are set by a given range by "id", supplying the classes to a counter t_hist update unit 57 and a counter b_hist update unit 60. Hereinafter, the class set by each "id" is referred to as an intensity class id.

The counter t_hist update unit 57 increments a counter t_hist 82 in the level difference information buffer 32 by 1 with respective to classes which are set by "id" according to the block level difference intensity supplied from the block-level difference intensity classification unit 56 and updates the counter. That is, the counter t_hist 82 is set in the arrangement according to "id". The counter t_hist 82 includes plural counters t_hist[id] set according to the intensity class "id", which count the number of pixels classified according to the intensity class "id". Hereinafter, the counter t_hist 82 is also referred to as a counter t_hist[id] 82 by each "id".

The block boundary determination unit 58 determines whether the pixel position corresponding to the block level difference supplied from the block-level difference characteristic detection unit 54 is a block boundary position or not based on the information of the block boundary position, supplying the determination result to the counter "btotal" update unit 59 and the counter b_hist update unit 60.

In the case where information of the block level difference supplied from the block-level difference characteristic detection unit 54 is acquired, the counter "btotal" update unit 59 increments a counter "btotal" 83 which is stored in the level difference information buffer 32 by 1 and updates the counter when information indicating that the pixel position corresponding to the acquired block level difference is the block boundary position is supplied form the block boundary determination unit 58.

In the case where the intensity class "id" supplied from the block-level difference intensity classification unit 56 is acquired, the counter b_hist update unit 60 increments a counter b_hist 84 which is stored in the level difference information buffer 32 by 1 and updates the counter when information indicating that the pixel position corresponding to the acquired intensity class "id" is the block boundary position is supplied from the block boundary determination unit 58. That is, the counter b_hist 84 includes plural counters b_hist[id] set according to the intensity class "id" of pixels belonging to the block boundary position, which count the number of pixels classified according to the intensity class "id" in pixels belonging the block boundary position. Hereinafter, the counter b_hist 84 is also referred to as a counter t_hist[id] 84 by each "id".

Figure 4:
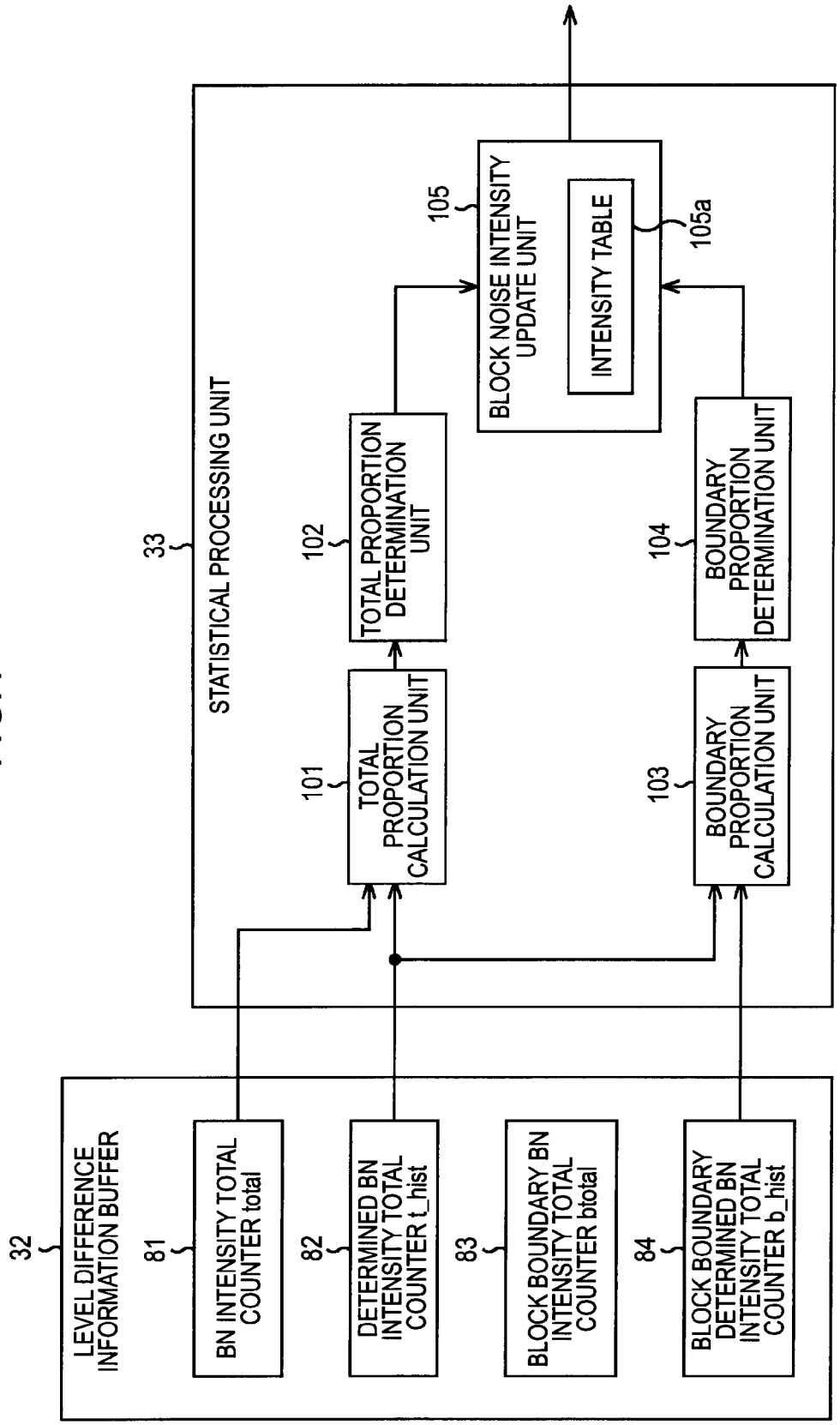
FIG. 4 is a block diagram explaining a configuration example of a statistical processing unit of FIG. 2.

Next, a detailed configuration example of the statistical processing unit 33 will be explained with reference to FIG. 4.

A total proportion calculation unit 101 calculates proportion of the counter t_hist[id] 81 in each intensity class "id" corresponding to the size of the block level difference with respect to the counter "total" 81 which is the entire number of pixels belonging to the detection range as the total proportion, supplying the total proportion to a total proportion determination unit 102.

The total proportion determination unit 102 compares the total proportion in each intensity class "id" with a given value, supplying the comparison result to a block noise intensity update unit 105.

A boundary proportion calculation unit 103 calculates proportion of the counter b_hist[id] 84 in each intensity class "id" corresponding to the size of the block level difference with respect to the counter t_hist[id] 82 at the block boundary as a boundary proportion, supplying the proportion to a boundary proportion determination unit 104.

The boundary proportion determination unit 104 compares the boundary proportion supplied from the boundary proportion calculation unit 103 with a given value, supplying the comparison result to the block noise intensity update unit 105.

The block noise intensity update unit 105 updates the intensity in a table 105*a* corresponding to the result in each intensity class "id" which has been statistically calculated as block noise intensity in each frame based on the determination result of the total proportion determination unit 102 and the boundary proportion determination unit 104.

Next, a detailed configuration example of the stabilization processing unit 34 will be explained with reference to FIG. 5.

An intensity change direction determination unit 121 calculates a change direction of intensity based on block noise intensity in an immediately preceding frame stored in a direction history storage unit 122 and block noise intensity of a current frame, supplying the direction to a direction comparison unit 123. The intensity change direction determination unit 121 stores the block noise intensity of the current frame in the direction history storage unit 122.

The direction comparison unit 123 compares the change direction of intensity supplied from the intensity change direction determination unit 121 with the change direction of intensity in the immediately preceding frame stored in a change direction history storage unit 124, determines whether change in the intensity change direction occurs and supplies information of intensity change direction to the change direction history storage unit 124 and a BN intensity candidate calculation unit 126 or an intensity stabilization unit 127 according to the determination result.

The change direction history storage unit 124 sequentially stores information of cumulative intensity change directions as history.

A reaction sensitivity adjustment unit 125 calculates the adjusted intensity change direction using a given conversion function based on information of cumulative intensity change directions stored in the change direction history storage unit 124, supplying the direction to the BN intensity candidate calculation unit 126.

The BN (block noise) intensity candidate calculation unit 126 calculates a BN intensity candidate of block noise intensity in the frame which is processed at present based on the immediately preceding block noise intensity and the adjusted change direction of intensity, supplying the candidate to the intensity stabilization unit 127.

The intensity stabilization unit 127 determines the intensity of block noise in the current frame while stabilizing the intensity according to intensity change of block noise in the current frame based on the BN intensity candidate supplied from the BN intensity candidate calculation unit 126 and information of intensity change direction in the immediately preceding frame stored in the direction history storage unit 122, outputting information of the determined block noise intensity in the current frame.

Figure 6:
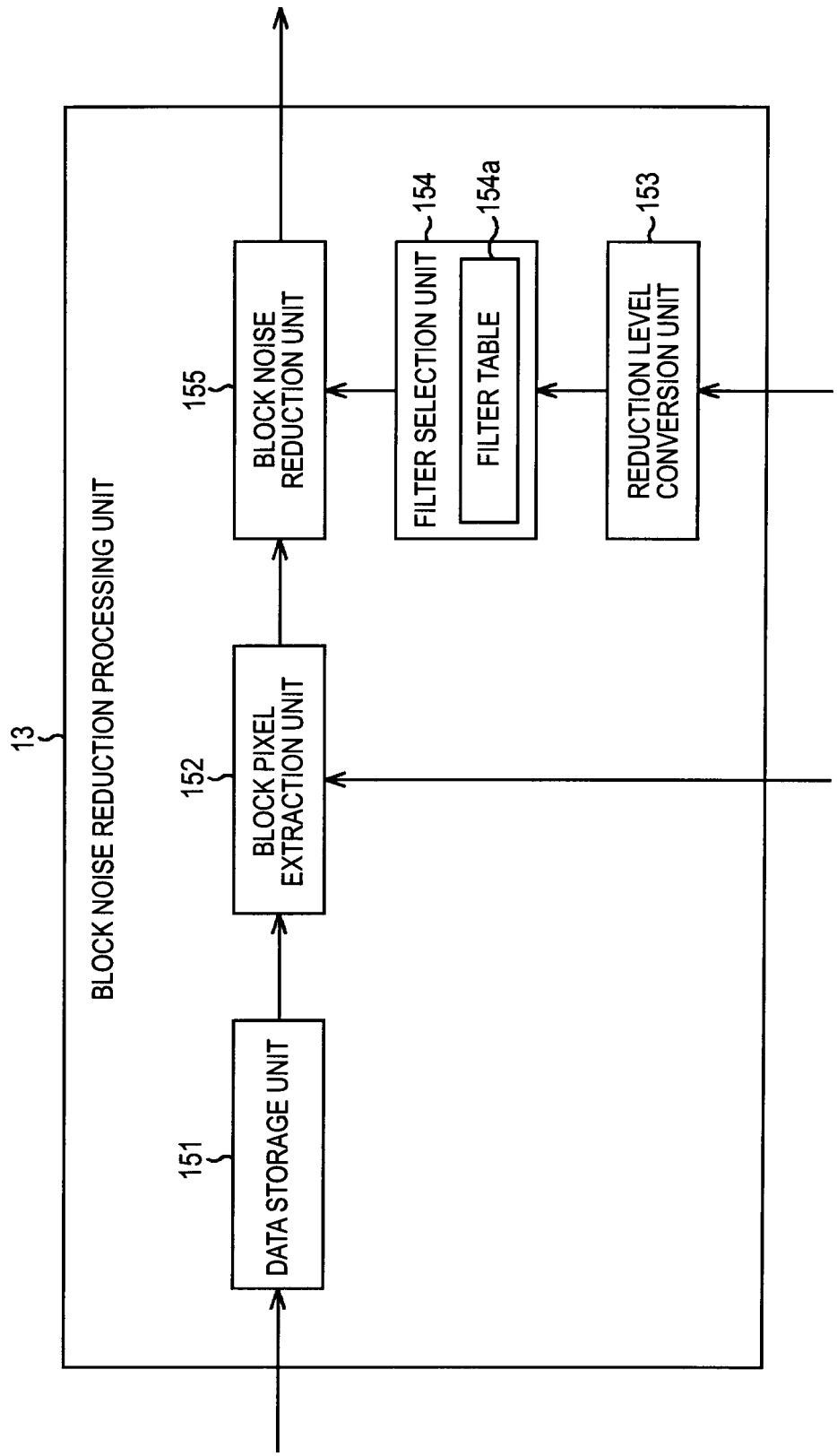
FIG. 6 is a block diagram explaining a configuration example of a block noise reduction processing unit of FIG. 1.

Next, a detailed configuration example of the block noise reduction processing unit 13 will be explained with reference to FIG. 6.

A data storage unit 151 stores information of pixel values of all pixels corresponding to the input image, supplying the information to a block pixel extraction unit 152 appropriately.

The block pixel extraction unit 152 reads pixels by the block from the data storage unit 151 based on information of the block boundary position, supplying the pixels to a block noise reduction unit 155.

A reduction level conversion unit 153 performs conversion into a reduction level indicating the intensity of block noise reduction processing so as to correspond to information of the block noise intensity of the current frame which has been statistically calculated supplied from the block noise intensity measurement unit 12, supplying the level to a filter selection unit 154.

The filter selection unit 154 selects a filter for block noise reduction processing stored in a filter table 154*a* in accordance with the reduction level, supplying information of the selected filter to the block noise reduction unit 155.

The block noise reduction unit 155 performs filter processing on pixels in each block supplied from the block pixel extraction unit 152 by the block unit by using the filter supplied from the filter selection unit 154 to thereby reduce block noise.

Next, image processing by the image processing device 1 as a noise reduction processing device will be explained with reference to a flowchart of FIG. 7.

Figure 8:
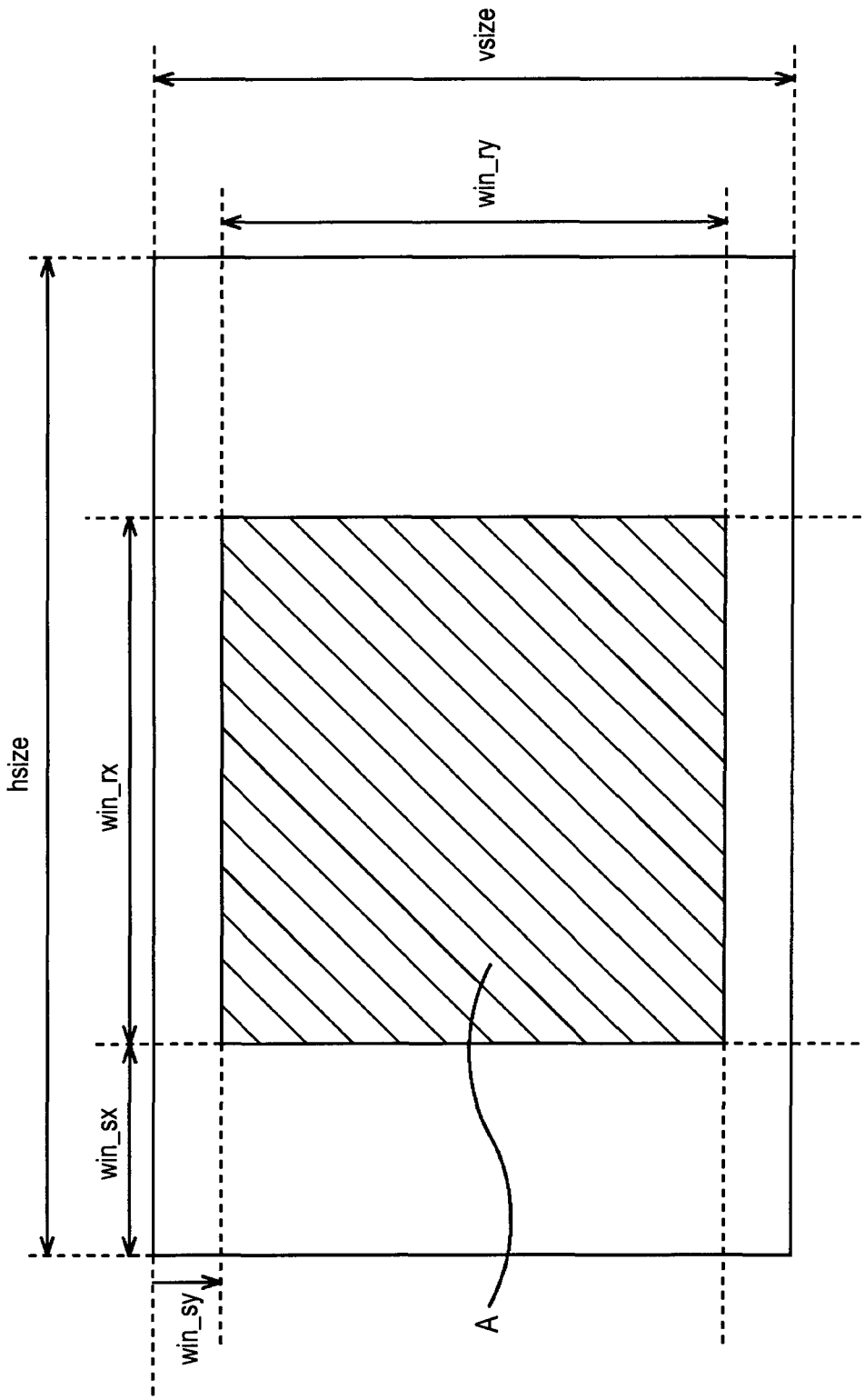
FIG. 8 is a view explaining a detection range in image processing.

In Step S1, the image processing device 1 sets a detection range for detecting intensity of block noise in the input image. The detection range can be set freely, however, it is most probable that the most proper image is read in the vicinity of the center in which distortion is small with respect to a field angle when the block noise intensity in each frame is calculated, therefore, in the case where the size of the input image is hsize (pixels)×vsize (pixels) with respect to the horizontal direction and the vertical direction as shown in FIG. 8, a detection range A having a position win_sx to win_rx in the horizontal direction and a position win_sy to win_ry in the horizontal direction is set. It is also preferable that plural detection ranges are set and block noise intensity is detected in respective detection ranges.

In Step S2, the image processing device 1 resets the direction history storage unit 122 of the stabilization processing unit 34.

In Step S4, the block boundary information detection unit 11 detects information of the block size and the block boundary position from the input image, supplying information of the block size and the block boundary position as the detection result to the block noise intensity measurement unit 12 and the block noise reduction processing unit 13. The information of the block size and the block boundary position can be information which is previously supplied with the input image data.

In Step S5, the block noise intensity measurement unit 12 executes block noise intensity measurement processing, calculating block noise intensity in each frame and supplying information of block noise intensity in each frame as the measurement result to the block noise reduction processing unit 13.

Here, the block noise intensity measurement processing of FIG. 2 will be explained with reference to a flowchart of FIG. 9.

In Step S11, the block-level difference information acquisition unit 31 executes block level difference information acquisition processing and stores block level difference information in each block in the level difference information buffer 32.

Figure 10:
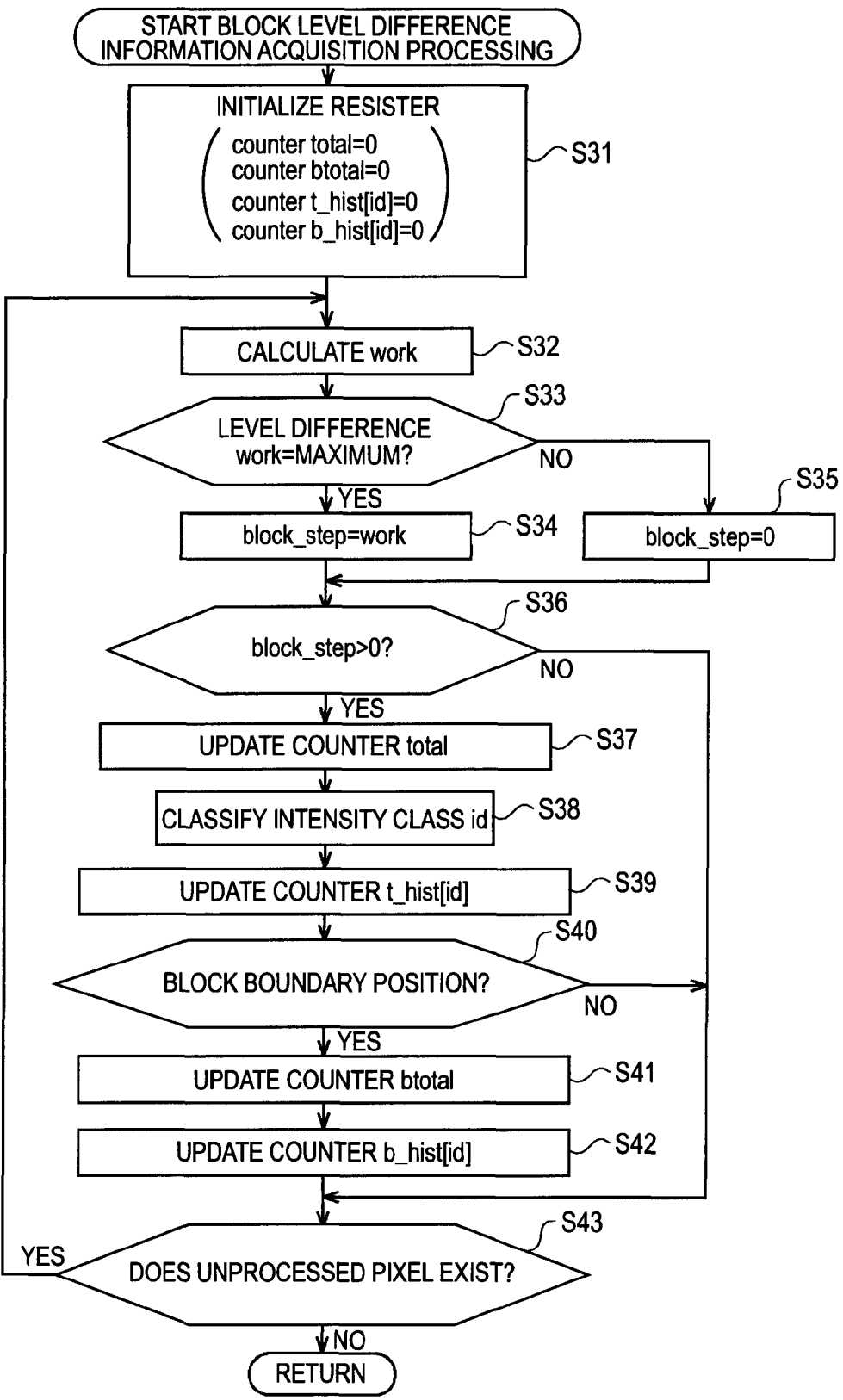
FIG. 10 is a flowchart explaining block-level difference information acquisition processing.

Here, the block-level difference information acquisition processing by the block-level difference information acquisition unit 31 of FIG. 3 will be explained with reference to a flowchart of FIG. 10.

In Step S31, the block-level difference intensity acquisition unit 31 initializes the counter "total" 81, the counter "btotal" 83, the counter t_hist[id] 82 and the counter b_hist 84 stored as registers in the level difference information buffer 32.

In Step S32, the level difference calculation unit 51 sets any of unprocessed pixels in the input image as a target pixel, calculates level differences "work" respectively with respect to the target pixel and reference pixels to be set according to the target pixel, and stores the calculation results in the level difference storage unit 52.

Figure 11:
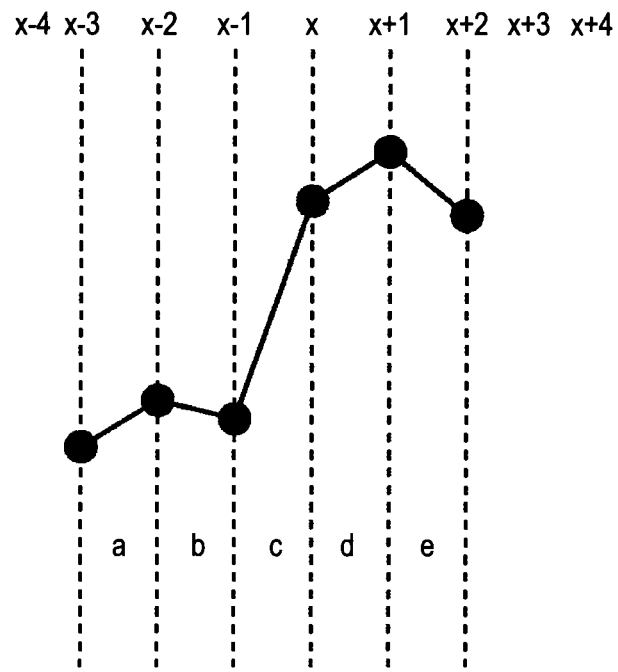
FIG. 11 is a view explaining block-level difference information acquisition processing.

For example, in the case where six pixels including two pixels adjacent in the right direction and three pixels adjacent in the left direction around the target pixel are used, when the target pixel is expressed as a pixel p[x] on the assumption that a coordinate position of the target pixel is "x" as shown in FIG. 11, two pixels adjacent in the right direction are respectively expressed as pixels P[x+1], P[x+2] from the pixel close to the target pixel, and pixels adjacent in the left direction are respectively expressed as pixels P[x−1], P[x−2] and P[x−3] from the pixel close to the target pixel. At this time, the level difference calculation unit 51 calculates the level difference "work" of the target pixel by using the following formula (1). In FIG. 11, the horizontal axis represents coordinates of pixels in the horizontal direction and the vertical axis represents pixel values of corresponding pixels. Here, processing with respect to the horizontal direction will be explained, however, processing can be naturally performed in the vertical direction.

$$\text{work}[x] = |P[x]-P[x-1]| - (|P[x-2]-P[x-3]| + |P[x-1]-P[x-2]| + |P[x+1]-P[x]| + |P[x+2]-P[x+1]|)/4 \quad (1)$$

Here, work[x] indicates the level difference of the target pixel P[x], P[x+1], P[x+2], P[x−1], P[x−2] and P[x−3] indicate pixel values of pixels P[x−3], P[x−2], P[x−1], P[x], P[x+1] and P[x+2] respectively.

That is, in the formula (1), a value is obtained by subtracting an average value of absolute differences of pixel values between pixels P[x−3], P[x−2], between pixels P[x−2], P[x−1], between pixels P[x], P[x+1] and between pixels P[x+1] and P[x+2] from the absolute difference of pixel values between the target pixel P[x] and the pixel P[x−1] which is the left side thereof.

Therefore, the level difference calculation unit 51 executes the same calculation as the above formula (1), thereby obtaining level differences of reference pixels work[x−3], work[x−2], work[x−1], work[x], work[x+1] and work[x+2] with respect to the pixels P[x−3], P[x−2], P[x−1], P[x], P[x+1] and P[x+2] respectively. In this case, the example in which the reference pixels are set as five pixels of P[x−3], P[x−2], P[x−1], P[x+1] and P[x+2] with respect to the target pixel P[x] has been explained, however, the number of pixels to be set as reference pixels is not limited to five pixels but other number of pixels can be applied. However, when the number of pixels used as reference pixels is more than the block size, it becomes difficult to determine the level difference at the block boundary which is described later, therefore, it is necessary to use the number of pixels which does not exceed the block size in right and left directions with respect to one block boundary at the maximum.

In Step S33, the level-difference maximum value determination unit 53 determines whether the level difference work[x] of the target pixel stored in the level difference storage unit 52 is the maximum value of the level differences of reference pixels work[x−3], work[x−2], work[x−1], work[x], work[x+1] and work[x+2] or not.

For example, when the level difference work[x] of the target pixel is the maximum value of the level differences of reference pixels work[x−3], work[x−2], work[x−1], work[x], work[x+1] and work[x+2] in Step S33, the level-difference maximum value determination unit 53 determines the level difference "work" of the target pixel is the block boundary level difference which is the level difference in pixels at the block boundary position based on the determination result, supplying the block boundary level difference block_step=work[x] to the block-level difference characteristic detection unit 54 in Step S34.

Figure 12:
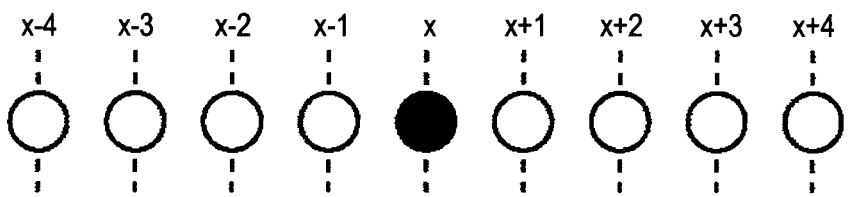
FIG. 12 is a view explaining block-level difference information acquisition processing.

That is, when the block boundary position exists between the pixel P[x] and the pixel P[x−1] as shown in FIG. 12, it is anticipated that the absolute difference of pixels values between the pixel P[x] and pixel P[x−1] will be larger than the average value of absolute differences between respective neighborhood pixels. Accordingly, in the case where the absolute difference between the pixel P[x] and pixel P[x−1] is larger than the average of the absolute differences between respective neighborhood pixels, the level difference work[x] of the target pixel is regarded as block boundary level difference block_step[x].

On the other hand, for example, when the level difference work[x] of the target pixel is not the maximum value of the level differences of neighborhood pixels work [x−3], work [x−2], work[x−1], work[x], work[x+1] and work[x+2] in Step S33, the level-difference maximum value determination unit 53 determines that the level difference "work" of the target pixel is not the block boundary level difference which is the level difference in pixels at the block boundary position based on the determination result, supplying the determination result as the block boundary level difference block_step=0 to the block-level difference characteristic detection unit 54 in Step S35.

In Step S36, the block-level difference characteristic detection unit 54 determines whether the block boundary level difference block_step[x] supplied from the level-difference maximum value determination unit 53 is larger than "0" or not, namely, whether block_step[x] indicates characteristics of the block boundary level difference or not.

When the block boundary level difference block_step[x] is larger than "0" and indicates characteristics of the block boundary level difference in Step S36, the block-level difference characteristic detection unit 54 notifies the block boundary level difference block_step to the counter "total" update unit 55, the block-level difference intensity classification unit 56, the block boundary determination unit 58 and the counter "btotal" update unit 59 as the BN (block noise) intensity in Step S37. In response to this, the counter total update unit 55 increments the counter "total" 81 stored in the level difference information buffer 32 which indicates the total number of pixels processed by the block-level difference characteristic detection unit 54 as the BN (block noise) intensity in the input image by 1 and updates the counter.

In Step S38, the block-level difference intensity classification unit 56 classifies the block difference to the intensity class "id" based on the block boundary level difference block_ step[x] supplied from the block-level difference characteristic detection unit 54, supplying the classified intensity class "id" to the counter t_hist update unit 57 and the counter b_hist update unit 60.

Figure 13:
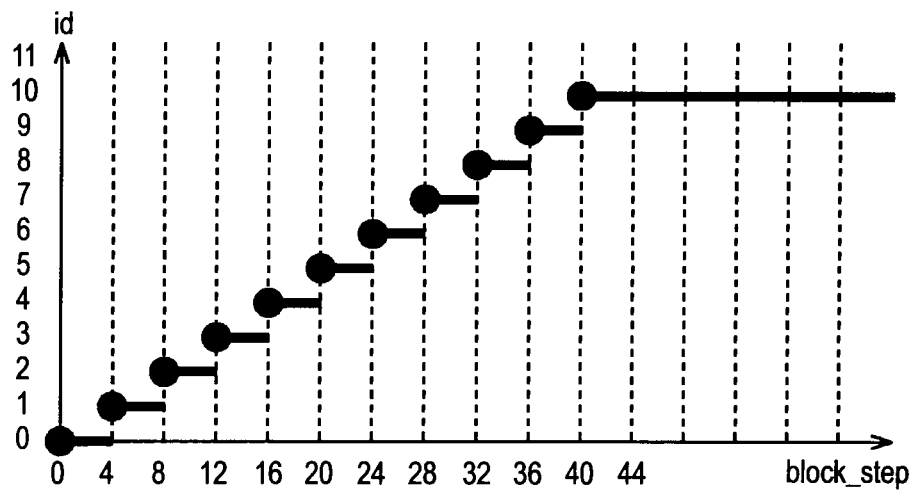
FIG. 13 is a view explaining block-level difference information acquisition processing.

That is, for example, as shown in FIG. 13, the block-level difference intensity classification unit 56 classifies the level difference into the intensity class "id"=0 when the block boundary level difference block_step[x] is equal to or more than "0" and less than 4, classifying the level difference into the intensity class "id"=1 when the block boundary level difference block_step[x] is equal to or more than 4 and less than 8, classifying the level difference into the intensity class "id"=2 when the block boundary level difference block_step [x] is equal to or more than 8 and less than 12, classifying the level difference into the intensity class "id"=3 when the block boundary level difference block_step[x] is equal to or more than 12 and less than 16, classifying the level difference into the intensity class "id"=4 when the block boundary level difference block_step[x] is equal to or more than 16 and less than 20, classifying the level difference into the intensity class "id"=5 when the block boundary level difference block_step [x] is equal to or more than 20 and less than 24, classifying the level difference into the intensity class "id"=6" when the block boundary level difference block_step[x] is equal to or more than 24 and less than 28, classifying the level difference into the intensity class "id"=7 when the block boundary level difference block_step[x] is equal to or more than 28 and less than 32, classifying the level difference into the intensity class "id"=8 when the block boundary level difference block_step [x] is equal to or more than 32 and less than 36, classifying the level difference into the intensity class "id"=9 when the block boundary level difference block_step[x] is equal to or more than 36 and less than 40, and classifying the level difference into the intensity class "id"=10 when the block boundary level difference block_step[x] is equal to or more than 40.

That is, in the case of FIG. 13, the block-level difference intensity classification unit 56 classifies the block level difference into plural intensity classes "id" in accordance with values of the block boundary level difference block_step[x].

Figure 14:
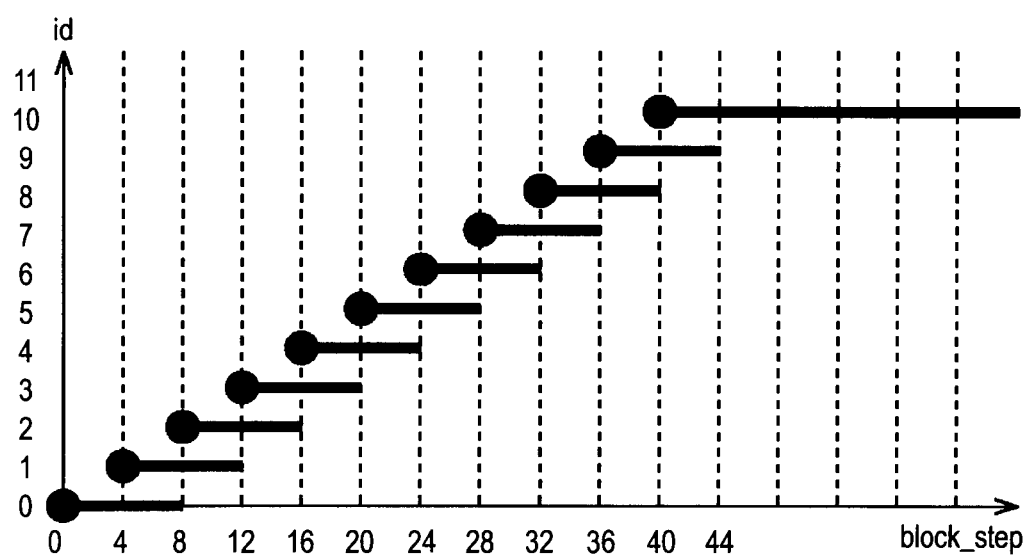
FIG. 14 is a view explaining block-level difference information acquisition processing.

In FIG. 13, the example in which the intensity class "id" is calculated one by one with respect to the block boundary level difference block_step[x] has been explained, however, the intensity class "id" is a value used for statistical processing as described later, therefore, for example, two kinds of intensity classes "id" may be calculated as shown in FIG. 14. That is, for example, as shown in FIG. 14, the block-level difference intensity classification unit 56 classifies the level difference into the intensity class "id"=0 when the block boundary level difference block_step[x] is equal to or more than "0" and less than 4, classifying the level difference into the intensity class "id"=0, 1 when the block boundary level difference block_ step[x] is equal to or more than 4 and less than 8, classifying the level difference into the intensity class "id"=1, 2 when the block boundary level difference block_step[x] is equal to or more than 8 and less than 12, classifying the level difference into the intensity class "id"=2, 3 when the block boundary level difference block_step[x] is equal to or more than 12 and less than 16, classifying the level difference into the intensity class "id"=3, 4 when the block boundary level difference block_step[x] is equal to or more than 16 and less than 20, classifying the level difference into the intensity class "id"=4, 5 when the block boundary level difference block_step[x] is equal to or more than 20 and less than 24, classifying the level difference into the intensity class "id"=5, 6 when the block boundary level difference block_step[x] is equal to or more than 24 and less than 28, classifying the level difference into the intensity class "id"=6, 7 when the block boundary level difference block_step[x] is equal to or more than 28 and less than 32, classifying the level difference into the intensity class "id"=7, 8 when the block boundary level difference block_ step[x] is equal to or more than 32 and less than 36, classifying the level difference into the intensity class "id"=8, 9 when the block boundary level difference block_step[x] is equal to or more than 36 and less than 40, classifying the level difference into the intensity class "id"=9, 10 when the block boundary level difference block_step[x] is equal to or more than 40 and less than 44 and classifying the level difference into the intensity class "id"=10 when the block boundary level difference block_step[x] is equal to or more than 44.

In Step S39, the counter t_hist update unit 57 increments the counter t_hist[id] 82 in the level difference information buffer 32 which indicates the total number in each "id" according to the block level difference intensity from the block-level difference intensity classification unit 56 by 1. As described above, when the two kinds of intensity classes "id" are calculated with respect to one block boundary level difference block_step, the counter t_hist update unit 57 increments each counter t_hist[id] 82 by 1.

In step S40, the block boundary determination unit 58 determines whether a position between the target pixel P[x] and the pixel P[x−1] in which the level difference work[x] has been calculated as a basis of the block boundary level difference block_step [x] is the block boundary position or not based on information of the block size and the block boundary position supplied from the block boundary information detection unit 11.

In Step 40, for example, when the position between the target pixel P[x] and the pixel P[x−1] in which the level difference work[x] has been calculated as a basis of the block boundary level difference block_step[x] is the block boundary position, the block boundary determination unit 58 supplies a signal indicating that the position is the block boundary to the counter "btotal" update unit 59 and the counter b_hist update unit 60 in Step S41. In response to this, the counter "btotal" update unit 59 increments the counter "btotal" 83 stored in the level difference buffer 32 which indicates the total number in the number of pixels processed by the block-level difference characteristic detection unit 54 as the block boundary level difference in the input image by 1, updating the counter.

In Step S42, the counter b_hist update unit 60 increments the counter b_hist[id] 84 stored in the level difference information buffer 32 which indicates the total number in the number of pixels processed by the block-level difference characteristic detection unit 54 as the block boundary level difference in the input image by 1. As described above, even when two kinds of intensity classes "id" are calculates with respect to one block boundary level difference block_step, the counter b_hist update unit 60 increments each counter b_hist [id] 84 by 1.

On the other hand, when it is determined that the block boundary level difference block_step[x] is not a value larger than "0", namely, that block_step[x] does not have characteristics of the block boundary level difference in Step S36, processing from Step S37 to S42 will be skipped. Also, when it is determined that the position is not the block boundary position in Step S40, processing of Step S41, S42 will be skipped.

In Step S43, the level difference calculation unit 41 determines whether there exists an unprocessed pixel in the detection range or not, and when there exists the unprocessed pixel, the process returns to Step S32. That is, the processing from Step S32 to S43 is repeated until it is determined that there does not exist an unprocessed pixel. When it is determined that there does not exist the unprocessed pixel in Step S43, the block level difference information acquisition processing is completed.

According to the above processing, the level differences "work" are calculated respectively with respect to all pixels in the detection range of the input image, the intensity class "id" is set so as to correspond to the block level difference intensity set to the level difference larger than the average value between reference pixels and the counter t_hist 82 in the level difference information buffer 32 is incremented by each "id" as well as the counter b_hist 84 in the level difference information buffer 32 is incremented by each intensity class "id" with respect to the pixel which is at the block boundary position. At that time, the counter "total" 81 in the level difference information buffer 32 is incremented with respect to the number of pixels within the detection range, and the counter "btotal" 83 in the level difference information buffer 32 is incremented with respect to the number of pixels at the block boundary position within the detection range.

Figure 15:
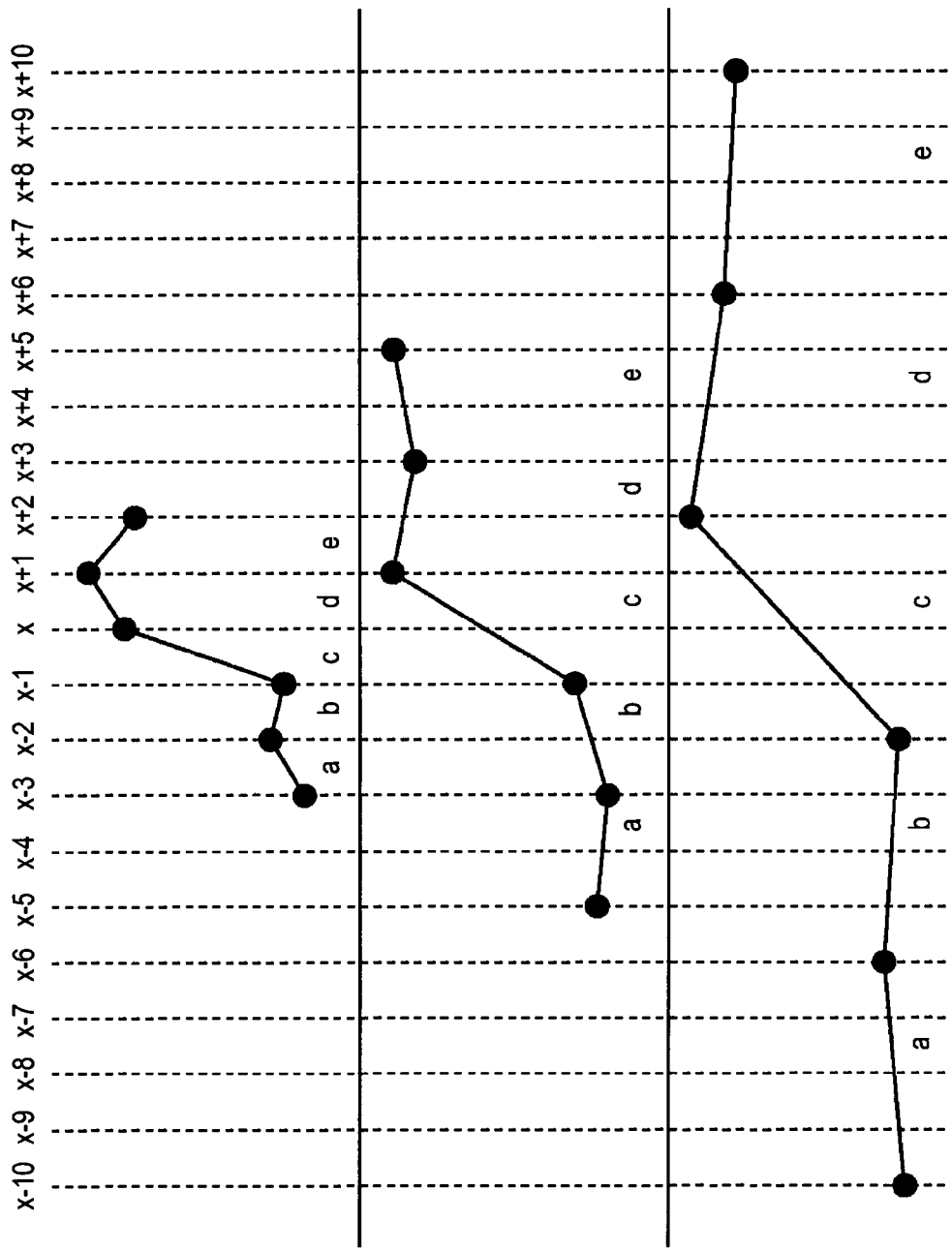
FIG. 15 is a view explaining block-level difference information acquisition processing.

In the above description, the example in which the block size is 8×8 pixel has been explained, however, it is feared that characteristics of the block level difference in the vicinity of the block boundary position are not captured only by the absolute differences of pixel values between adjacent pixels as shown in FIG. 11, for example, in the case where the block size is increased to 16×16 pixel or 32×32 pixel, for example, by scaling. Accordingly, in the case where the block size is increased, for example, when the relation between the target pixel and neighborhood pixels as shown in FIG. 11 is shown by an upper column of FIG. 15, it is preferable that the distance between the target pixel and the neighborhood pixel or between neighborhood pixels is not set between adjacent pixels of each pixel but set between pixels of every other pixel as shown in a middle column in FIG. 15, or preferable that the distance between the target pixel and the neighborhood pixel or between neighborhood pixels is set between pixels of every three pixels as shown in a lower column of FIG. 15. Here, explanation is returned to the flowchart of FIG. 9.

When the block level difference information acquisition processing is completed in Step S11, the statistical processing unit 33 executes statistical processing in Step 12, which calculates block noise intensity of the input image in each frame and supplies the intensity to the stabilization processing unit 34.

Figure 16:
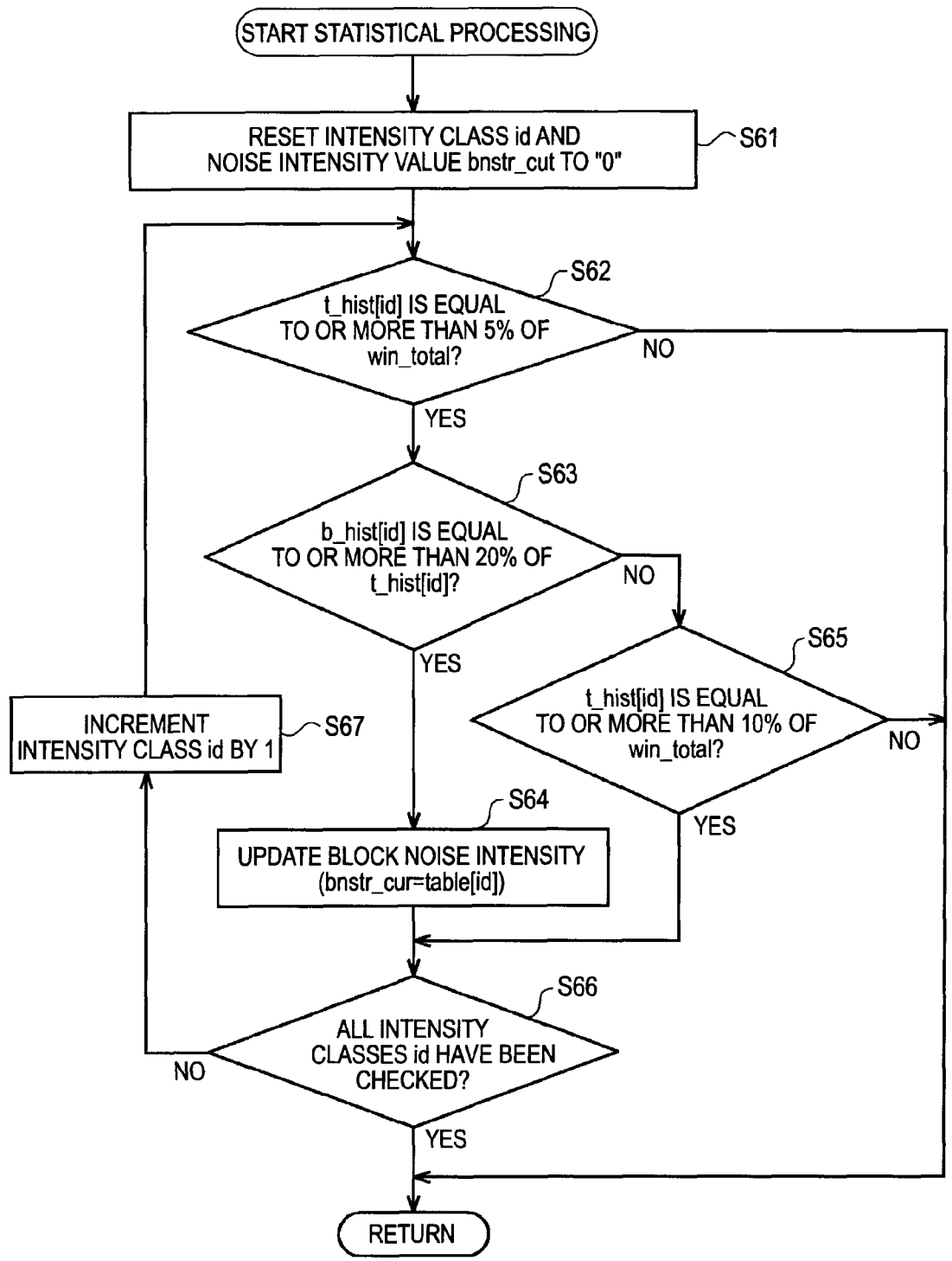
FIG. 16 is a flowchart explaining statistical processing.

Here, the statistical processing by the statistical processing unit 33 will be explained with reference to FIG. 16.

In Step S61, the block noise intensity update unit 105 resets the intensity class "id" which is the counter indicating the intensity class and a noise intensity value bnstr_cur, and sets them to "0".

In Step S62, the total proportion calculation unit 101 makes access to the level difference information buffer 32, reads the counter "total" 81 and the counter t_hist[id] 82, calculates proportion of the counter t_hist[id] 82 with respect to the total number of pixels win total (value of the counter "total" 81) (=t_hist[id]/total:referred to also the total proportion in the following description), and supplies the proportion to the total proportion determination unit 102. The total proportion determination unit 102 determines whether the total proportion is equal to or more than 5% and supplies the determination result to the block noise intensity update unit 105.

When the total proportion is determined to be, for example, equal to or more than 5% in Step S62, the boundary proportion calculation unit 103 makes access to the level difference information buffer 32, reads the counter t_hist[id] 82 and the counter b_hist[id] 84, calculates proportion of the counter b_hist[id] 84 with respect to the counter t_hist[id] 82 (=b_hist [id]/t_hist[id]:referred to also the boundary proportion in the following description), and supplies the proportion to the boundary proportion determination unit 104. The boundary proportion determination unit 104 determines whether the boundary proportion is equal to or more than 20% or not and supplies the determination result to the block noise intensity update unit 105.

Figure 17:
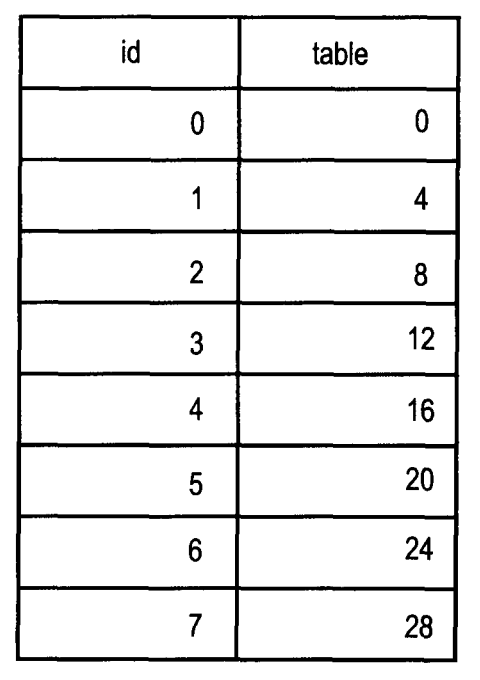

When the proportion of the counter b_hist[id] 84 with respect to the counter t_hist[id] 82 is equal to or more than 20% in Step S63, the block noise intensity update unit 105 updates the block noise intensity value bnstr_cur at the frame of the current input image as table[id] by referring to the intensity table 105a based on determination results of the total proportion determination unit 102 and the boundary proportion determination unit 104 in Step S64. That is, for example, when the intensity table 105a is shown in FIG. 17, the block noise intensity update unit 105 sets the noise intensity value bnstr_cur to "0" when the intensity class "id" is "0", setting the noise intensity value bnstr_cur to 4 (=table[1]) when the intensity class "id" is 1, setting the noise intensity value bnstr_cur to 8 (=table[2]) when the intensity class "id" is 2, setting the noise intensity value bnstr_cur to 12 (=table [3]) when the intensity class "id" is 3, setting the noise intensity value bnstr_cur to 16 (=table[4]) when the intensity class "id" is 4, setting the noise intensity value bnstr_cur to 20 (=table[5]) when the intensity class "id" is 5, setting the noise intensity value bnstr_cur to 24 (=table[6]) when the intensity class "id" is 6, setting the noise intensity value bnstr_cur is set to 28 (=table[7]) when the intensity class "id" is 7. The intensity table 105a in FIG. 17 is obtained by substantially returning the intensity class in FIG. 13 to the block level difference intensity, however, it is not limited to this but other intensity tables 105a can be applied.

In Step S66, whether all intensity classes "id" indicating noise intensity have been processed or not is determined, and when it is determined that all intensity classes "id" have not been processed, the block noise intensity update unit 105 increments the intensity class "id" by 1 and the process returns to Step S62. That is, the processing from Step S62 to S67 is repeated until it is determined that all intensity classes "id" has been processed. Then, when it is determined that all intensity classes "id" have been processed in Step S66, the statistical process is completed.

On the other hand, for example, when it is determined that the total proportion is not equal to or more than 5% in Step S62, the statistical processing is completed.

Furthermore, when the boundary proportion is not equal to or more than 20% in Step S63, the total proportion calculation unit 101 makes access to the level difference information buffer 32, reads the counter "total" 81 and the counter h_hist [id] 82, calculates the total proportion (=t_hist[id]/total) and supplies the total proportion to the total proportion determination unit 102. The total proportion determination unit 102 determines whether the total proportion is equal to or more than 10%. Then, when the total proportion (=t_hist[id]/total) is equal to or more than 10% in Step S65, the process proceeds to Step S66 and the sequential processing is repeated. When the total proportion (=t_hist[id]/total) is not equal to or more than 10% in Step S65, the statistical processing is completed.

That is, for example as shown in FIG. 18, when respective counters b_hist[id] 84 indicate 300, 150, 45, 18, 15, 10, 2 and 1 and the counters t_hist[id] 82 indicate 1000, 400, 200, 110, 50, 60 20 and 10 corresponding to intensity classes "id" which are 0 to 7, the boundary proportions (=b_hist[id]/t_hist [id]) are respectively 30%, 38%, 23%, 16%, 30%, 17%, 10% and 10%, and the total proportions (=t_hist[id]/total) are respectively 54%, 22%, 11%, 6%, 3%, 3%, 1% and 1%.

Accordingly, in the case of FIG. 18, when the block noise intensities "id" are 0 to 3, the total proportions (=t_hist[id]/total) are all more than 5, therefore, existence probability of noise in the counter "id" indicating noise viewed as a whole is regarded as noise at the considerable level, and processing is performed. In this case, the example in which the block size is 8×8 pixel in principle is cited, therefore, the ratio is regarded as approximately 1/8=12.5 in a state with no distortion and a threshold is set to be 5 as a value smaller than 12.5. However, it is not inevitably necessary that it is set to be 5. For example, when the block size is 8×8 pixel, it is preferable that the threshold is set to be a value smaller than 12.5.

Furthermore, when the block noise intensities "id" are 0 to 2, the boundary proportion (=b_hist [id]/t_hist [id]) is all more than 20%, therefore, the block noise intensity value bnstr_cur in a frame is sequentially updated. Therefore, in the case of FIG. 18, the block noise intensity value bnstr_cur is sequentially updated, specifically, the noise intensity value bnstr_cur will be "0" when the block noise intensity "id" is "0", the noise intensity value bnstr_cur will be "4" when the block noise intensity "id" is "1" at the next loop, and the noise intensity value bnstr_cur will be "8" when the block noise intensity "id" is "2".

Next, when the block noise intensity "id" is 3, the boundary proportion (=b_hist[id]/t_hist [id]) is not more than 20%, therefore, the noise intensity value bnstr_cur is not updated, however, the total proportion is equal to or more than 10%, the processing is not stopped when the block noise intensity "id" is 3, and the process proceeds to the processing of block noise intensity "id"=4.

On the other hand, the total proportion of the block noise intensity "id"=4 (=t_hist [id]/total) is not equal to or more than 5, and existence probability of noise in the counter "id" indicating noise intensity viewed as a whole is regarded as noise at the negligible level, then the processing is stopped.

As a result, the block noise intensity bnstr_cur in the frame in conditions shown by FIG. 18 is fixed to 8.

The total proportion (=t_hist[id]/total) is generally monotone-decreasing with respect to the counter "id" as shown in FIG. 18. Accordingly, the counter "id" is processed in the ascending order of power in the flowchart of FIG. 16, therefore, the processing is stopped at the time when the total proportion is not equal to or more than 5, namely, at the time of the block noise "id"=4 in FIG. 18.

In this case, as the example in which the block size is 8×8 pixel in principle is cited, the ratio is regarded as approximately 1/8=12.5 in a state with no distortion, and when the block distortion exists, a value is assumed to be larger than 12.5 and the ratio is set to 20% as a threshold. Accordingly, when the block size is 8×8 pixel, it is preferable that the threshold is set to be a value larger than 12.5.

Accordingly to the above processing, the maximum block noise intensity in block noise intensities in which block distortion tends to appear, which occupies relatively large proportion statistically can be obtained as the block noise intensity of the frame.

Figure 9:
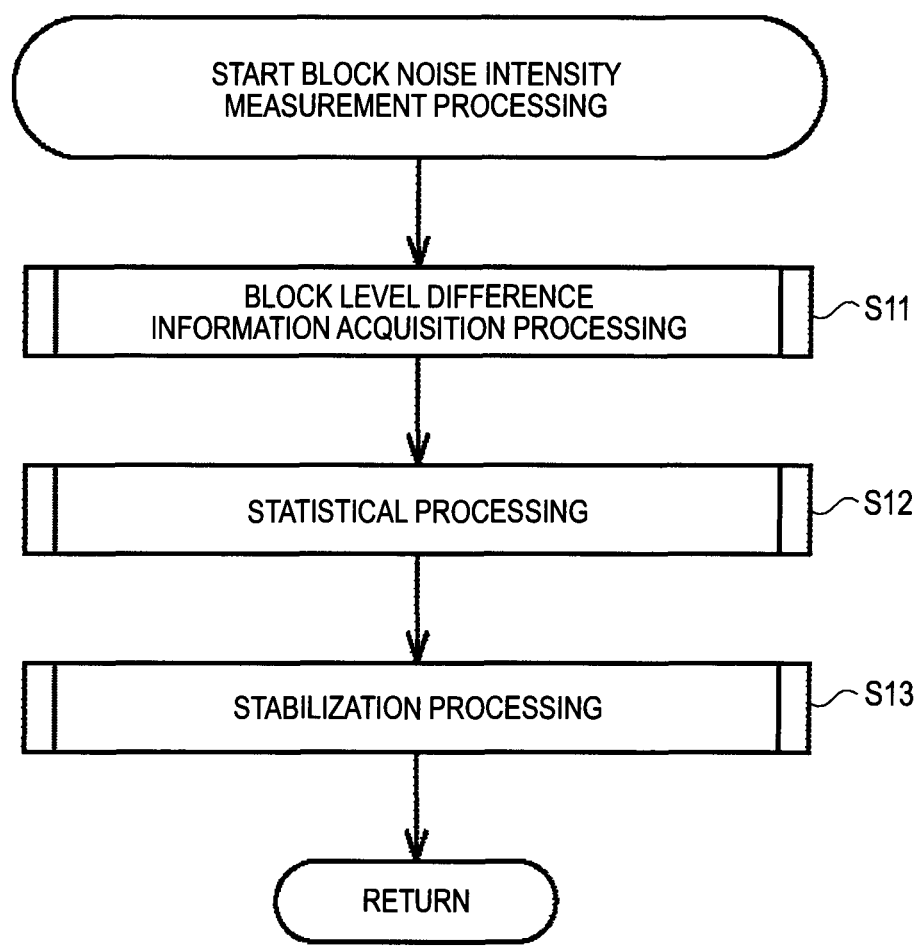
FIG. 9 is a flowchart explaining block noise intensity measurement processing.

Here, explanation is returned to the flowchart of FIG. 9.

After the statistical processing is performed in Step S12, the stabilization processing unit 34 executes stabilization processing in Step S13, that is, the stabilization processing of the obtained block noise intensity bnstr_cur based on the block noise intensity bnstr_cur in previous and subsequent frames, then, outputs the noise intensity to the block noise reduction processing unit 13.

Here, stabilization processing by the stabilization processing unit 34 will be explained with reference to the flowchart of FIG. 19.

In Step S81, the intensity change direction determination unit 121 stores the block noise intensity bnstr_cur in the direction history storage unit 122 as well as determines whether the block noise intensity bnstr_cur is larger than a block noise intensity bnstr_pre in the immediately preceding frame stored in the direction history storage unit 122.

In Step S81, for example, when the block noise intensity bnstr_cur is not larger than the block noise intensity bnstr_pre, the intensity change direction determination unit 121 determines whether the block noise intensity bnstr_cur is smaller than the block noise intensity bnstr_pre in the immediately preceding frame stored in the direction history storage unit 122 or not in Step S82.

In Step S82, for example, when the block noise intensity bnstr_cur is not smaller than the block noise intensity bnstr_pre, that is, when the block noise intensity bnstr_cur is the same as the block noise intensity bnstr_pre, the intensity change direction determination unit 121 sets an intensity change direction trans_cur to "0" in Step S83, supplying the direction to the direction comparison unit 123.

On the other hand, in Step S81, for example, when the block noise intensity bnstr_cur is larger than the block noise intensity bnstr_pre, the intensity change direction determination unit 121 sets the intensity change direction trans_cur to "1" in Step S84, supplying the direction to the direction comparison unit 123.

Furthermore, in Step S82, when the block noise intensity bnstr_cur is smaller than the block noise intensity bnstr_pre, the intensity change direction determination unit 121 sets the intensity change direction trans_cur to "−1" in Step S85, supplying the direction to the direction comparison unit 123.

In other words, when the block noise intensity tends to increase in the time direction by comparison between the block noise intensity bnstr_cur in the current frame and the block noise intensity bnstr_pre in the immediately preceding frame, the intensity change direction trans_cur is set to "1", when the block noise intensity does not change in the time direction, the intensity change direction trans_cur is set to "0", and when the block noise intensity tends to decrease in the time direction, the intensity change direction trans_cur is set to "−1".

In Step S86, the direction comparison unit 123 determines whether the intensity change direction trans_cur in the current frame is "0" or not.

When the intensity change direction trans_cur in the current frame is not "0" in Step S86, the direction comparison unit 123 compares the intensity change direction trans_cur in the current frame with a cumulative intensity change direction "trans", determining whether the positive and negative relation between the intensity change direction trans_cur and the cumulative intensity change direction "trans" is the same or not in Step S87.

For example, when the intensity change direction trans_cur in the current frame and the cumulative intensity change direction "trans" is the same direction in Step S87, the direction comparison unit 123 adds the intensity change direction trans_cur in the current frame supplied from the intensity change direction determination unit 121 to the cumulative intensity change direction "trans" and updates the "trans", then, stores the direction in the change direction history storage unit 124 in Step S88. At this time, the direction comparison unit 123 supplies the intensity change direction trans_cur in the current frame supplied from intensity change direction determination unit 121 also to the BN intensity candidate calculation unit 126.

Figure 20:
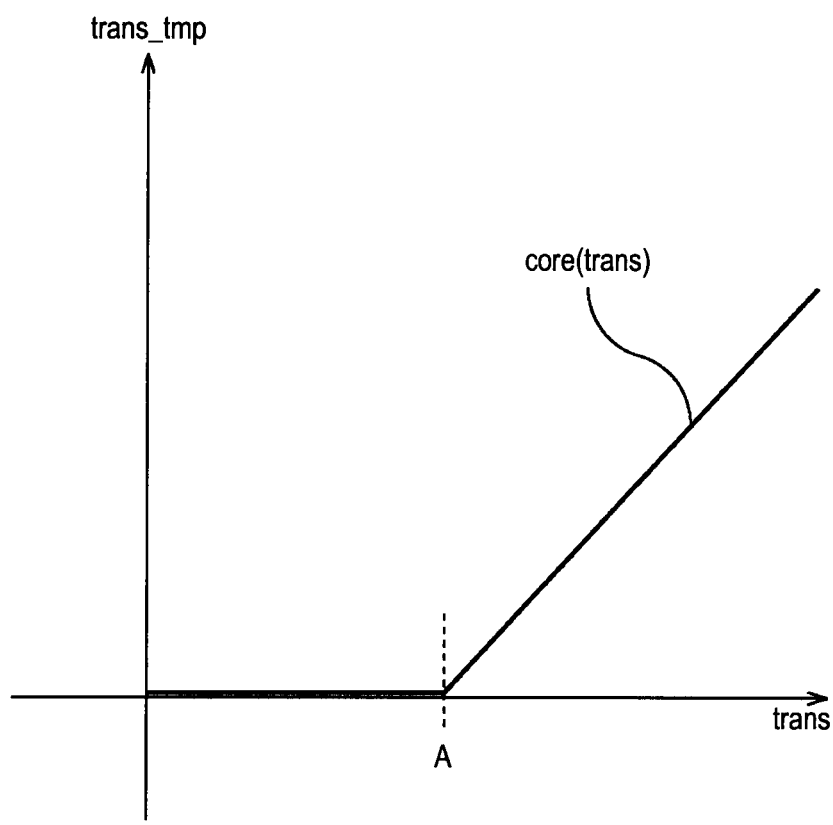
FIG. 20 is a graph explaining stabilization processing.

In Step S89, the reaction sensitivity adjustment unit 125 adjusts the cumulative intensity change direction "trans" stored in the change direction history storage unit 124 using a given function, calculates an adjusted intensity change direction trans_tmp and supplies the direction to the BN intensity candidate calculation unit 126. Specifically, for example, the adjusted intensity change direction trans_tmp is calculated by using a function "core (trans)" as shown in FIG. 20. In FIG. 20, when the cumulative intensity change direction "trans" is less than A, the adjusted intensity change direction trans_tmp is set to "0", and when the cumulative intensity change direction "trans" is equal to or more than A, the adjusted intensity change direction trans_tmp is set to "core (trans-A). That is, value change is slowed down by the function even when the intensity change direction sharply changes, and as a result, reaction sensitivity is adjusted.

In Step S90, the BN intensity candidate calculation unit 126 calculates a BN intensity candidate bnstr_tmp using the following formula (2) and supplies the candidate to the intensity stabilization unit 127.

$$\text{bnstr\_tmp} = \text{bnstr\_pre} + \text{trans\_tmp} \quad (2)$$

That is, the BN intensity candidate bnstr_tmp can be obtained as a value adjusted by adding the adjusted intensity change direction trans_tmp to the block noise intensity bnstr_pre in the immediately preceding frame so as to correspond to the temporal change of the intensity change direction.

In Step S91, the intensity stabilization unit 127 determines whether the intensity change direction trans_cur in the current frame is larger than "0" or not, that is, whether the block noise intensity is increased in accordance with the temporal change or not. For example, when the intensity change direction trans_cur in the current frame is larger than "0", a stabilized block noise intensity bnstr in the current frame is obtained by calculating the following formula (3) in Step S92, supplying the intensity bnstr to the block noise reduction processing unit 13.

$$\text{bnstr} = \text{Max}(\text{bnstr\_tmp}, \text{bnstr\_cur}) \quad (3)$$

In the above formula, "Max (A, B)" is a function of selecting a larger value from A and B. That is, when the intensity change direction trans_cur in the current frame is larger than "0", a larger value in the BN intensity candidate bnstr_tmp and the block noise intensity bnstr_cur in the current frame is set as the stabilized block noise intensity bnstr in the current frame. That is, since the intensity change direction is in the increasing direction, the larger value in the BN intensity candidate bnstr_tmp and the block noise intensity bnstr_cur in the current frame is selected.

When the intensity change direction trans_cur in the current frame is not larger than "0" in Step S91, the intensity stabilization unit 127 obtains the stabilized block noise intensity bnstr in the current frame by calculating the following formula (4) in Step S93, supplying the intensity bnstr to the block noise reduction processing unit 13.

$$\text{bnstr} = \text{Min}(\text{bnstr\_tmp}, \text{bnstr\_cur}) \quad (4)$$

Here, "Min (A, B)" is a function of selecting a smaller value from A and B. That is, when the intensity change direction trans_cur in the current frame is not larger than "0", a smaller value in the BN intensity candidate bnstr_tmp and the block noise intensity bnstr_cur in the current frame is set as the stabilized block noise intensity bnstr in the current frame. That is, since the intensity change direction is in the decreasing direction, the smaller value in the BN intensity candidate bnstr_tmp and the block noise intensity bnstr_cur in the current frame is selected.

On the other hand, in the case where the intensity change direction trans_cur in the current frame is "0" in Step S86, or in the case where the intensity change direction trans_cur and the cumulative intensity change direction "trans" indicate the same direction in Step S87, the intensity stabilization unit 127 sets the stabilized block noise intensity bnstr in the current frame to the block noise intensity bnstr_pre in the immediately preceding frame in Step S94. At this time, the intensity stabilization unit 127 sets the cumulative intensity change direction "trans" stored in the change direction history storage unit 124 to "0".

Figure 21:
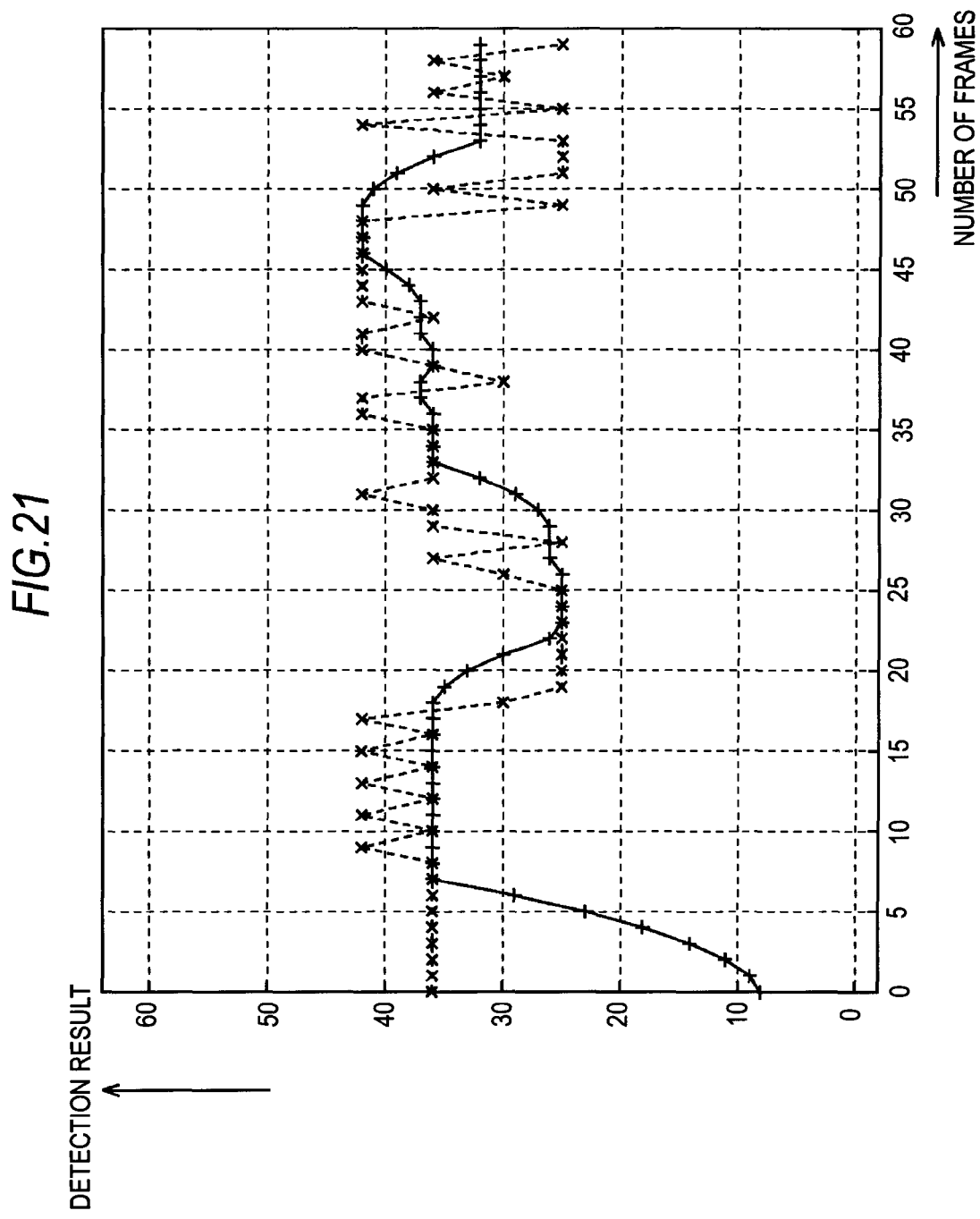
FIG. 21 is a graph explaining stabilization processing.

According to the above processing, the block noise intensity is stabilized as shown in, for example, FIG. 21. In FIG. 21, the horizontal axis represents the number of frames and the vertical axis represents block noise intensity, further, a solid line represents the stabilized block noise intensity bnstr and a dotted line represents the block noise intensity bnstr_cur in respective frames before stabilization.

Specifically, for example, in frames 0 to 8, the block noise intensity bnstr_cur in the current frame is larger than the block noise intensity bnstr_pre in the immediately preceding frame in Step S81, therefore, processing of Step S84, S86 to Step S91, Step S93 is sequentially repeated, and the block noise intensity is stably increased from the initial value to a value in the vicinity of 36 which is the block noise intensity bnstr_cur in the current frame with the rate of change in accordance with a duration period.

In frames 9 to 18, the intensity change direction is not the same as the immediately preceding frame in Step S87 and the block noise intensity in the immediately preceding frame is maintained, therefore, a constant block noise intensity bnstr is continued.

In frames 19 to 25, the block noise intensity bnstr_cur in the current frame is smaller than the block noise intensity bnstr_pre in the immediately preceding frame in Step S81, therefore, processing of Step S84, and S86 to Step S92 is sequentially repeated, the block noise intensity is stably decreased to a value in the vicinity of 25 which is the block noise intensity bnstr_cur in the current frame with the rate of change in accordance with the duration period.

In frames 26 to 35, the block noise intensity will be approximately in the vicinity of 36 except frames 28, 31. Accordingly, the block noise intensity bnstr_cur in the current frame is basically larger than the block noise intensity bnstr_pre in the immediately preceding frame in Step S81, therefore, processing of Step S84, S86 to Step S91, and Step S93 is sequentially repeated, and the block noise intensity is stably increased from the initial value to a value in the vicinity of 36 which is the block noise intensity bnstr_cur in the current frame with the rate of change in accordance with the duration period. Even when unstable change occurs in frames 28, 31, large changes are absorbed by the reaction sensitivity trans_tmp, therefore, the stabilized block noise intensity bnstr can stably change the value.

In frames 36 to 48, the block noise intensity will be approximately in the vicinity of 42 except frames 38, 39, and 42. Accordingly, the block noise intensity bnstr_cur in the current frame is basically larger than the block noise intensity bnstr_pre in the immediately preceding frame in Step S81, therefore, processing of Step S84, S86 to Step S91, and S93 is sequentially repeated, and the block noise intensity is stably increased to a value in the vicinity of 42 which is the block noise intensity bnstr_cur in the current frame with the rate of change in accordance with the duration period. Even when unstable change occurs in frames 38, 39 and 42, large changes are absorbed by the reaction sensitivity trans_tmp, therefore, the stabilized block noise intensity bnstr can stably change the value.

In frames 49 to 53, the block noise intensity bnstr_cur in the current frame is smaller than the block noise intensity bnstr_pre in the immediately preceding frame except the frame 54 in Step S81, therefore, processing of Step S84, S86 to Step S92 is sequentially repeated, the block noise intensity is stably decreased to a value in the vicinity of 25 which is the block noise intensity bnstr_cur in the current frame with the rate of change in accordance with the duration period. Even when unstable change occurs in frame 54, large change are absorbed by the reaction sensitivity trans_tmp, therefore, the stabilized block noise intensity bnstr can stably change the value.

In frame 54 to 59, the intensity change direction is not the same as the immediately preceding frame in Step S87 and the block noise intensity in the immediately preceding frame is maintained, therefore, the constant block noise intensity bnstr is continued.

That is, even when the block noise intensity in the current frame sharply changes, an immediately preceding value is applied as long as the change direction is not the same by the comparison with the change direction of the block noise intensity of the immediately preceding frame, and further, small change in the change direction is not followed, therefore, it is possible to stabilize small movements. When the change direction of the block noise intensity in the immediately preceding frame coincides, it is possible to gently follow the intensity with the rate of change in accordance with the length of the period during in which coincidence of the direction is continued.

According to the above processing, the block noise intensity is adjusted so that extremely large variation of values does not occur while considering the intensity change direction of the block noise intensity of the frames to the immediately preceding frame in time series, thereby adjusting the block noise in each frame.

Figure 19:
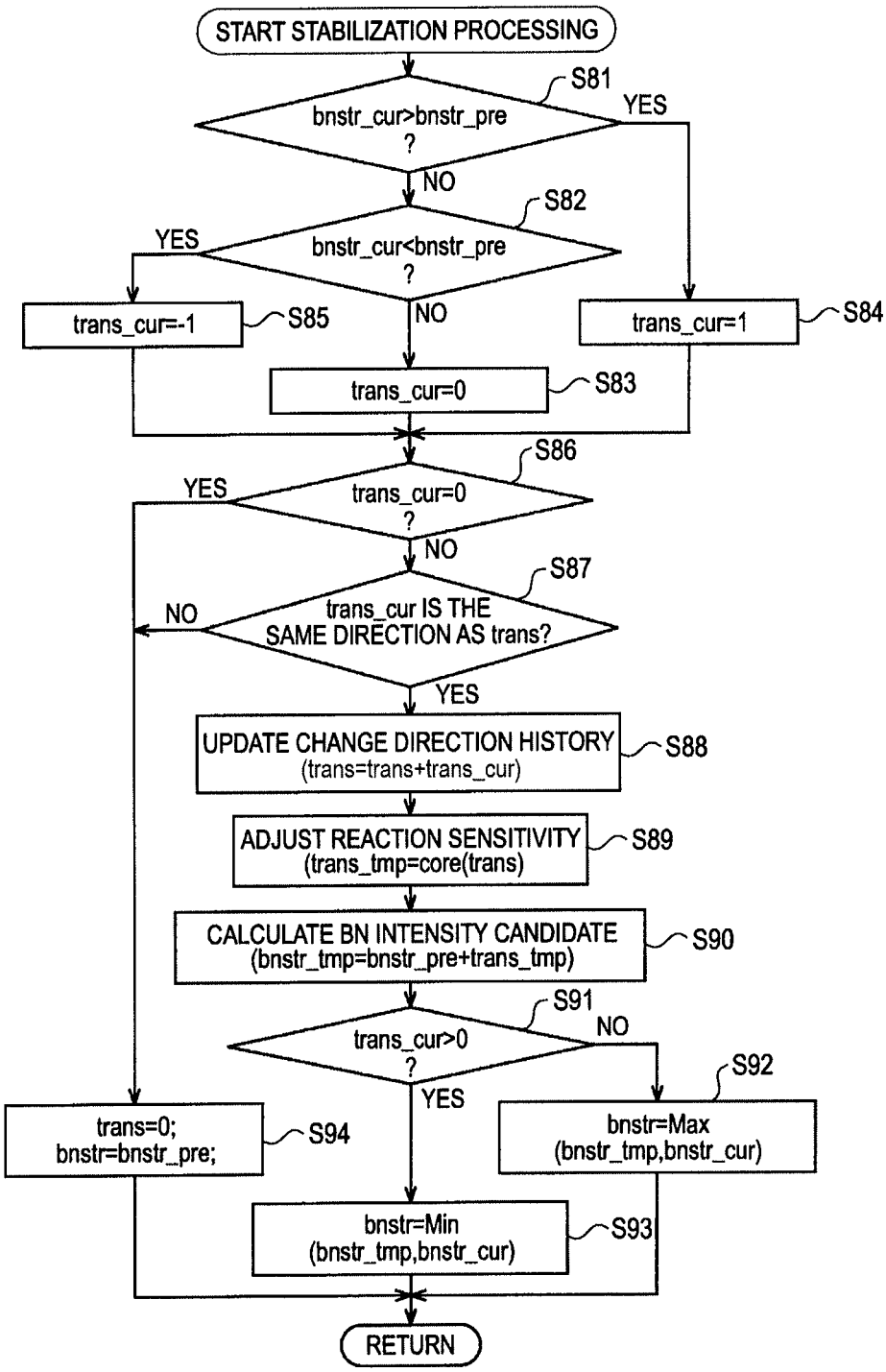
FIG. 19 is a flowchart explaining stabilization processing.

Here, the explanation is returned to the flowchart of FIG. 19.

When the stabilization processing is completed in Step S93, the block noise intensity measurement processing is completed.

Figure 7:
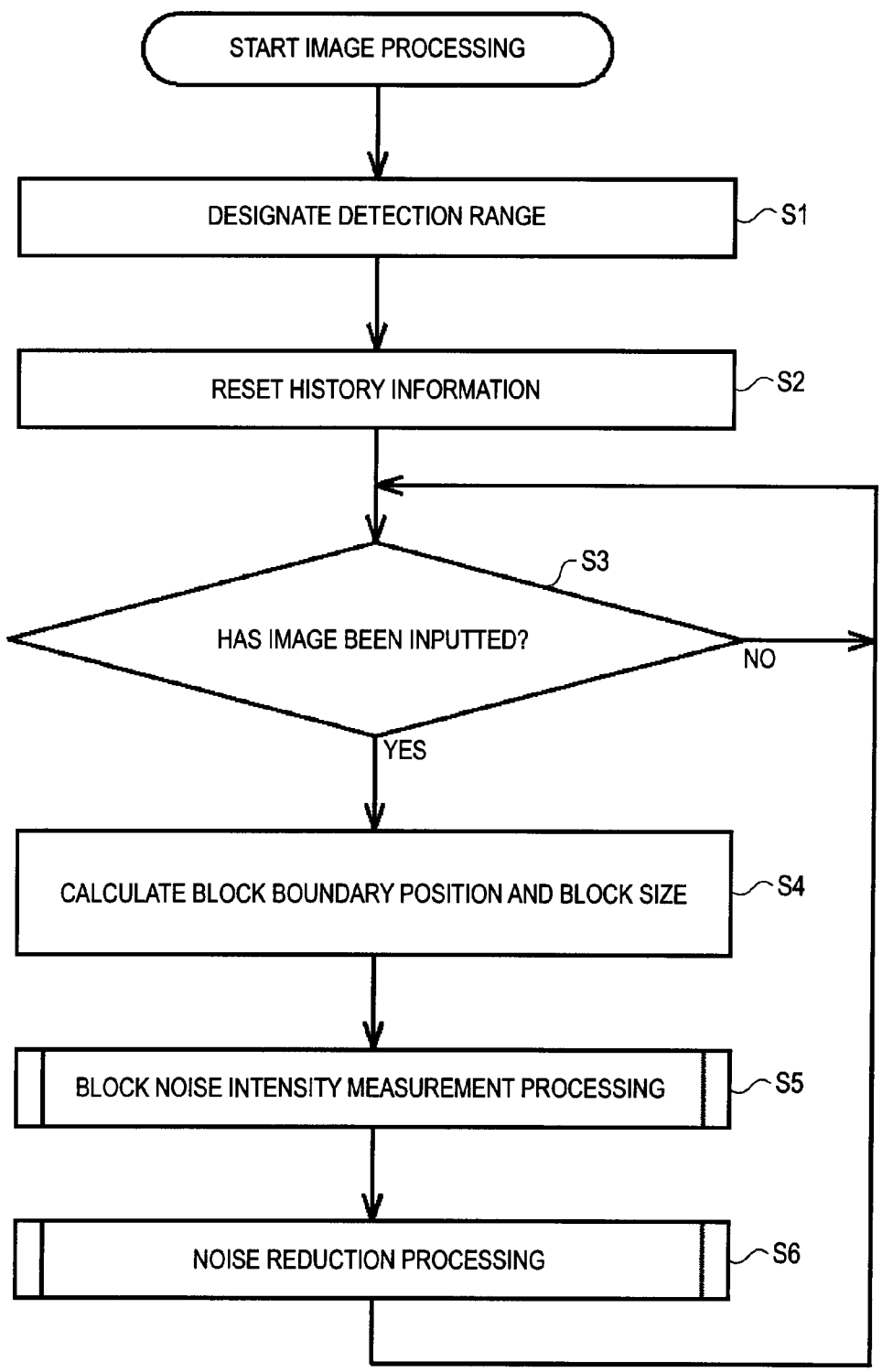
FIG. 7 is a flowchart explaining image processing.

Here, the explanation is returned to the flowchart of FIG. 7.

After the block noise intensity is measured by the block noise intensity measurement unit 12 in Step S5, block noise reduction processing is performed by the block noise reduction processing unit 13 in Step S6, thereby reducing the block noise of the input image and outputting the image in which block noise reduction processing has been performed.

Figure 22:
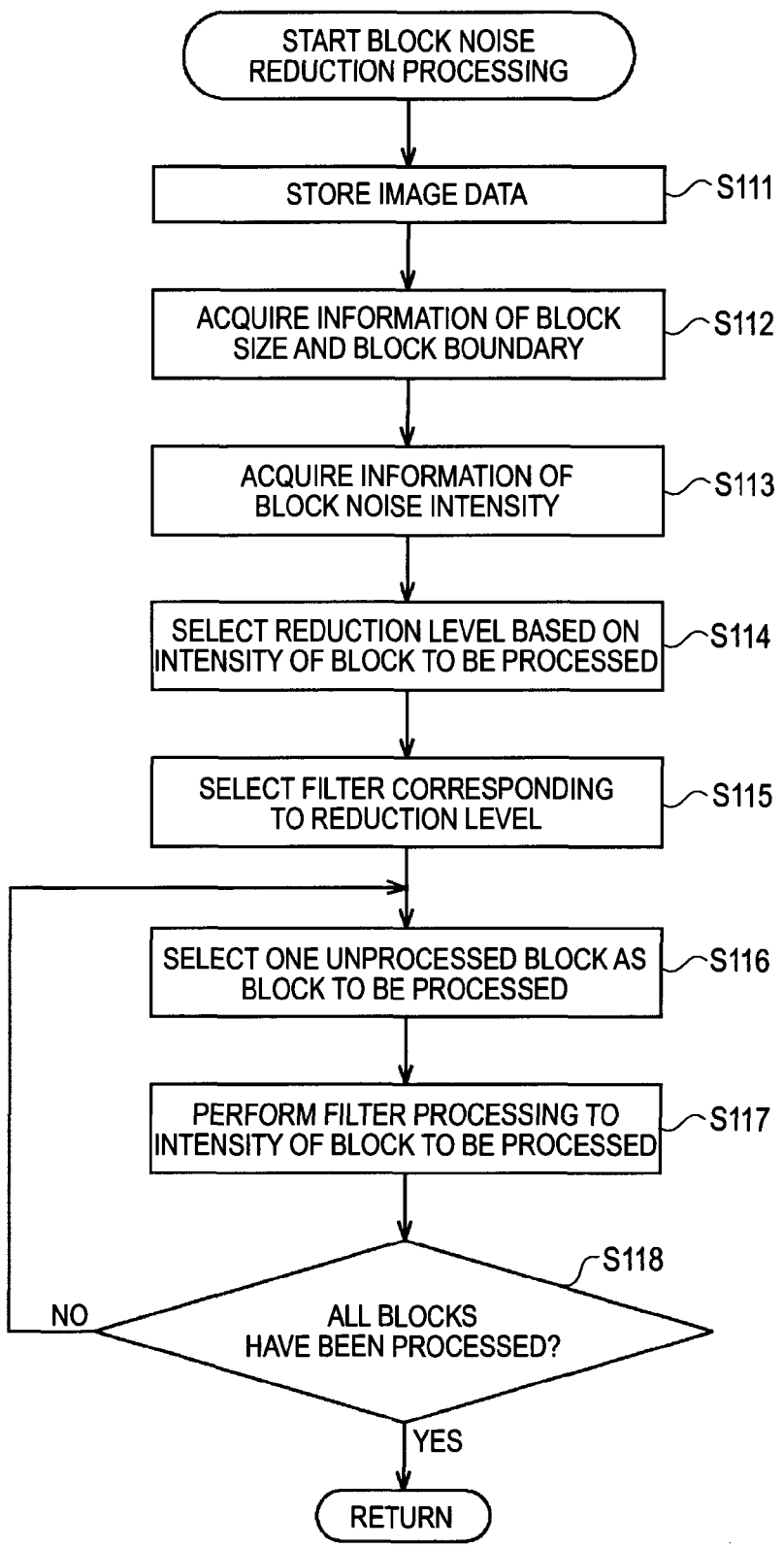
FIG. 22 is a flowchart explaining block noise reduction processing.

Here, the block noise reduction processing by the block noise reduction processing unit 13 of FIG. 6 will be explained with reference to a flowchart of FIG. 22.

In Step S111, the data storage unit 151 stores the input image.

In Step S112, the block pixel extraction unit 152 acquires information of the block boundary position and the block size supplied from the block boundary information detection unit 11.

In Step S113, the reduction level conversion unit 153 acquires the statistically-obtained block noise intensity bnstr in the current frame supplied from the block noise intensity measurement unit 12.

In Step S114, the reduction level conversion unit 153 performs conversion of the block noise into a reduction level to which the block noise is necessary to be reduced based on information of the block noise intensity bnstr and supplies the level to the filter selection unit 154. The reduction level is set to a value so as to correspond to the block noise intensity bnstr.

In Step S115, the filter selection unit 154 selects a filter previously set from the filter table 154a so as to correspond to the value of the reduction level and supplies the filter to the block noise reduction unit 155.

In Step S116, the block pixel extraction unit 152 sets one unprocessed block as a block to be processed as well as reads the block pixels from the data storage unit 151 and supplies them to the block noise reduction unit 155.

In Step S117, the block noise reduction unit 155 reduces the block noise of pixels in the block to be processed by the filter supplied from the filter selection unit 154, sequentially outputting pixels in the noise reduction processed image.

In Step S118, the block pixel extraction unit 152 determines whether there exists an unprocessed block or not, and when there exists an unprocessed block, the process returns to Step S116. That is, processing of Step S116 to Step S118 is repeated until it is determined that there does not exist an unprocessed block. Then, it is determined that all blocks have been processed in Step S118, the processes ends.

According to the above process, it is possible to remove the block noise while optimizing the reduction level of the block noise in accordance with the block noise intensity.

According to the embodiment of the invention, the block noise intensity bnstr is obtained and the noise reduction level of the filter for reducing the block noise is set by the obtained block noise intensity bnstr, thereby reducing the block noise in each block, therefore, it is possible to prevent deletion of necessary image information or residual block noise by reducing the block noise of the image, as a result, block noise can be efficiently reduced.

In the above, particularly as described with reference to FIG. 21, the stabilized block noise intensity is gently followed with respect to variation of the block noise intensity in time series, thereby effectively reducing the block noise.

However, concerning moving pictures including a so-called scene change which is, for example, transition from an outside scenery to a weather forecast scene in a news program and the like, or scene change by panning the camera in a sport program and so on in television broadcasting, it is difficult to follow variations of the block noise intensity before and after the scene change, as a result, it is difficult to reduce block noise effectively.

Figure 23:
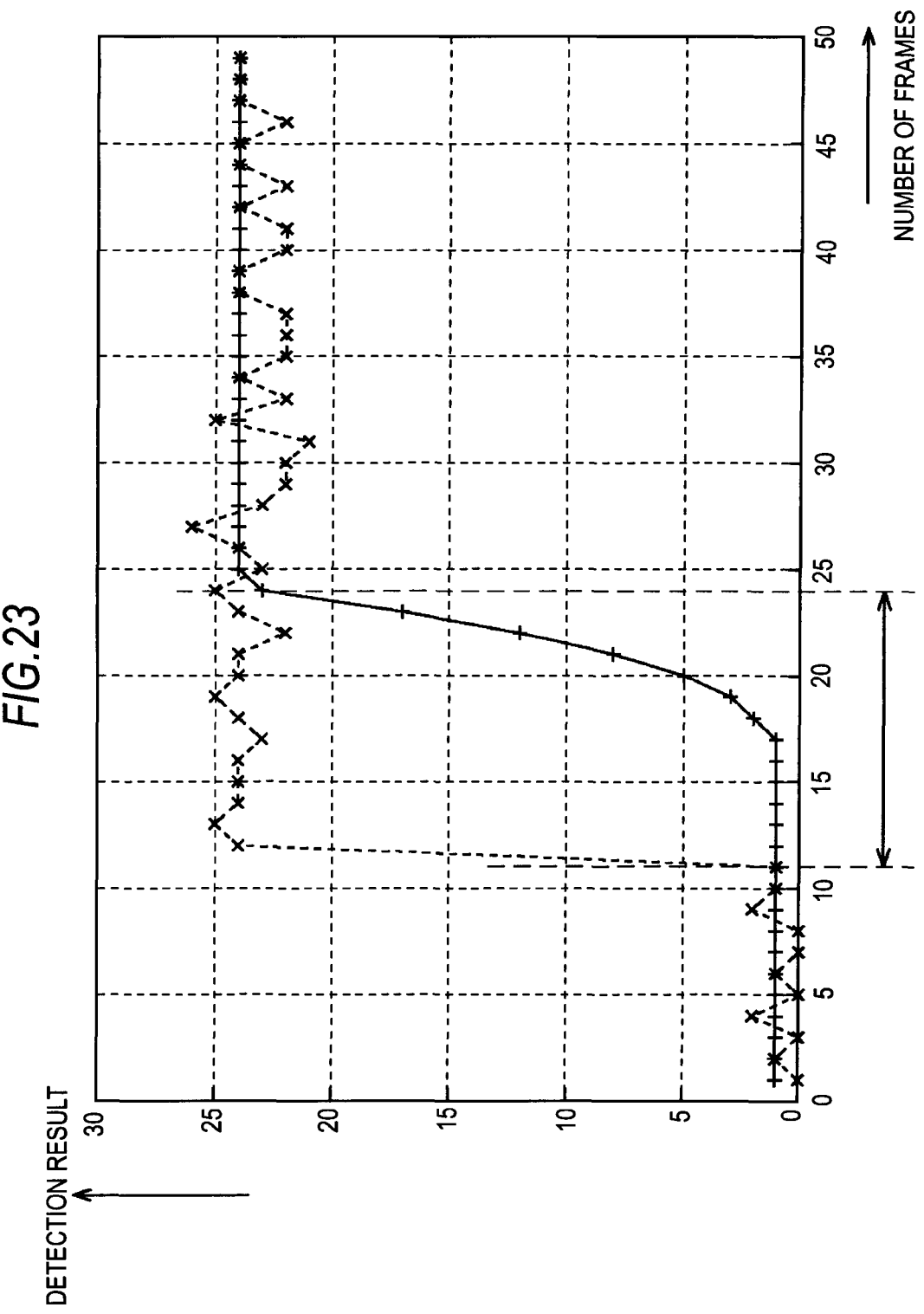
FIG. 23 is a graph explaining stabilization processing when the motion amount sharply changes.

More specifically, when a scene with a few block noise such as a landscape which is close to a still image is changed to a scene with much noise such as flowing river which has vigorous movement, the block noise intensity is stabilized as shown in FIG. 23. In FIG. 23, the horizontal axis represents the number of frames and the vertical axis represents the block noise intensity, further, a solid line represents the stabilized block noise intensity and a dotted line represents the block noise intensity in respective frames before stabilization.

In FIG. 23, frames 1 to 11 indicates a scene with a few block noise and frames after 12 indicates a scene with much block noise concerning frames before stabilization. That is, the scene change occurs between the frame 11 and the frame 12. On the other hand, the stabilized block noise intensity changes gently in a period from the frame 11 to a frame 24, which is shown by both arrows. Therefore, in frames 11 to 24, noise reduction processing is performed on the assumption that the block noise intensity is low, therefore, it is difficult to reduce the block noise efficiently. This can be happen not only at the time of scene change but at the time when the motion amount in the image sharply changes even in the same scene, for example, when brightness sharply changes, such as in flash imaging by a camera.

In a case inverse to the above described case, in which the scene with much block noise is changed to the scene with a few block noise, noise reduction processing is performed on the assumption that the block noise intensity is high in a period in which the stabilized block noise intensity changes (decreased) gently, as a result, image quality deteriorates.

The slowdown in sharp change of block noise intensity as described above, namely, the lowering of reaction sensitivity (reaction speed from block noise detection until the detection result is reflected on the noise reduction processing) is realized by the reaction sensitivity adjustment unit 125 as described above. More specifically, the reaction sensitivity is determined by the value A in the function "core (trans)" of FIG. 20, and the higher the value A is, the lower the reaction sensitivity becomes, as a result, variation of block noise intensity is reduced and stabilized. On the other hand, the lower the value A is, the higher the reaction sensitivity becomes.

Therefore, in the case where sharp change of the motion amount, such as in a scene change, occurs in moving pictures, the value A in the function (core) in FIG. 20 is reduced and the reaction sensitivity is increased, thereby reducing the block noise efficiently.

In the following description, an image processing device in which sharp change of the motion amount is detected and reaction sensitivity is adjusted in accordance with the detection result will be explained.

First, a configuration example of another embodiment of the block noise intensity measurement unit 12 in the image processing device 1 (FIG. 1) will be explained with reference to FIG. 24. In an image processing device including another embodiment of the block noise intensity measurement unit 12, functions of the block boundary information detection unit 11 and the block noise reduction processing unit 13 are the same as functions provided in the image processing device 1 of FIG. 1.

Figure 2:
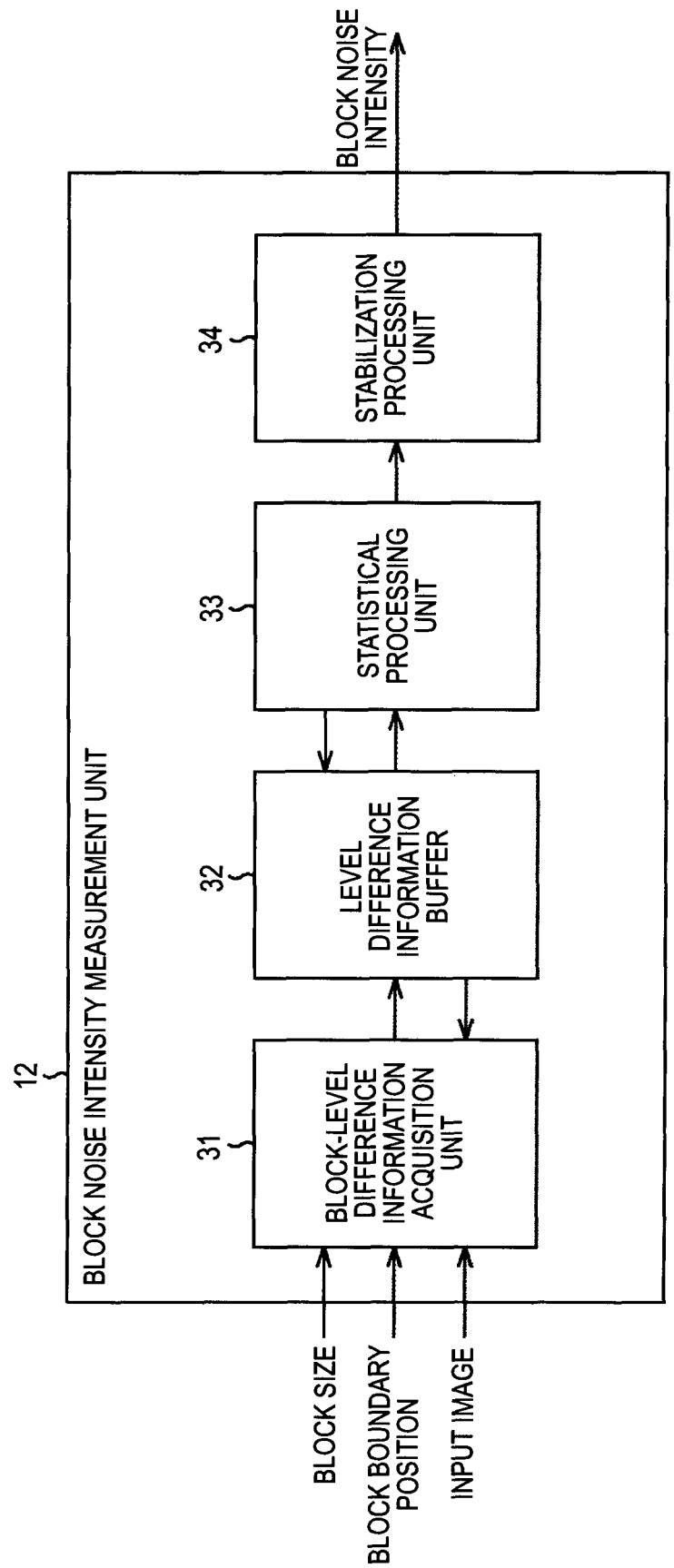
FIG. 2 is a block diagram explaining a configuration example of a block noise intensity measurement unit of FIG. 1 according to the embodiment.
Figure 24:
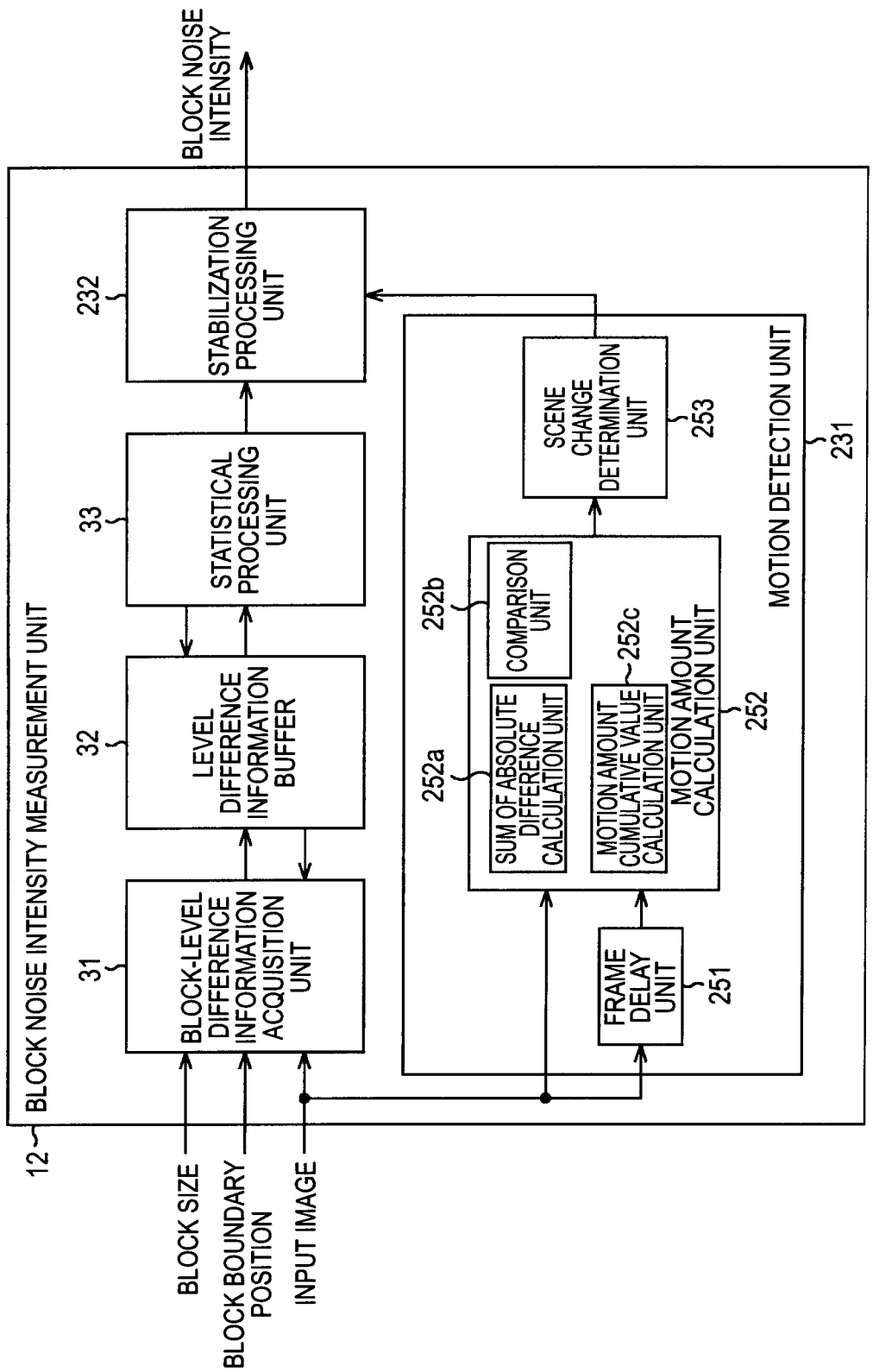
FIG. 24 is a block diagram explaining a configuration example of a block noise intensity measurement unit according to another embodiment.

In the block noise intensity measurement unit 12 of FIG. 24, same names and codes are given to components having the same function as components provided in the block noise intensity measurement unit 12 of FIG. 2, and the explanation thereof will be appropriately omitted.

That is, the block noise intensity measurement unit 12 of FIG. 24 differs from the block noise intensity measurement unit 12 of FIG. 2 in points that a motion detection unit 231 is newly provided and that a stabilization processing unit 232 is provided instead of the stabilization processing unit 34.

The motion detection unit 231 includes a frame delay unit 251, a motion amount calculation unit 252 and a scene change determination unit 253.

The frame delay unit 251 temporarily stores an input image and supplies an image immediately preceding to the input image by one frame (hereinafter, referred to as an immediately preceding image) to the motion amount calculation unit 252.

The motion amount calculation unit 252 includes a sum of absolute difference calculation unit 252a, a comparison unit 252b and a motion amount cumulative value calculation unit 252c, which calculates a motion amount in the input image based on the input image and the immediately preceding image. More specifically, the sum of absolute difference calculation unit 252a reads target pixels in the input image (pixel to be processed) and pixels corresponding to the target pixels in the immediately preceding image (reference pixel) and calculates the sum of absolute differences of pixel values of respective corresponding pixels between frames pixel by pixel. The comparison unit 252b compares the sum of absolute differences between frames calculated pixel by pixel with a given threshold, calculating the motion amount in each pixel based on the comparison result. The motion amount cumulative value calculation unit 252c adds motion amounts in respective pixels of one frame pixel by pixel, calculates the motion amount cumulative value and supplies the value to the scene change determination unit 253.

The scene change determination unit 253 determines whether the scene change occurs between the input image and the immediately preceding image based on the motion amount cumulative value supplied from the motion amount calculation unit 252, supplying information indicating the result to the stabilization processing unit 232.

The stabilization processing unit 232 has the same function as the stabilization processing unit 34 of FIG. 2, and further, corrects the block noise intensity of the input image to be stabilized based on information indicating whether the scene change has occurred or not supplied from the scene change determination unit 253, supplying the corrected result to the block noise reduction processing unit 13 as the block noise intensity.

Next, a configuration example of the stabilization processing unit 232 according to the embodiment will be explained with reference to FIG. 25. In the stabilization processing unit 232 of FIG. 25, same names and codes are given to components having the same function as components provided in the stabilization processing unit 34 of FIG. 5, and the explanation thereof will be appropriately omitted.

Figure 5:
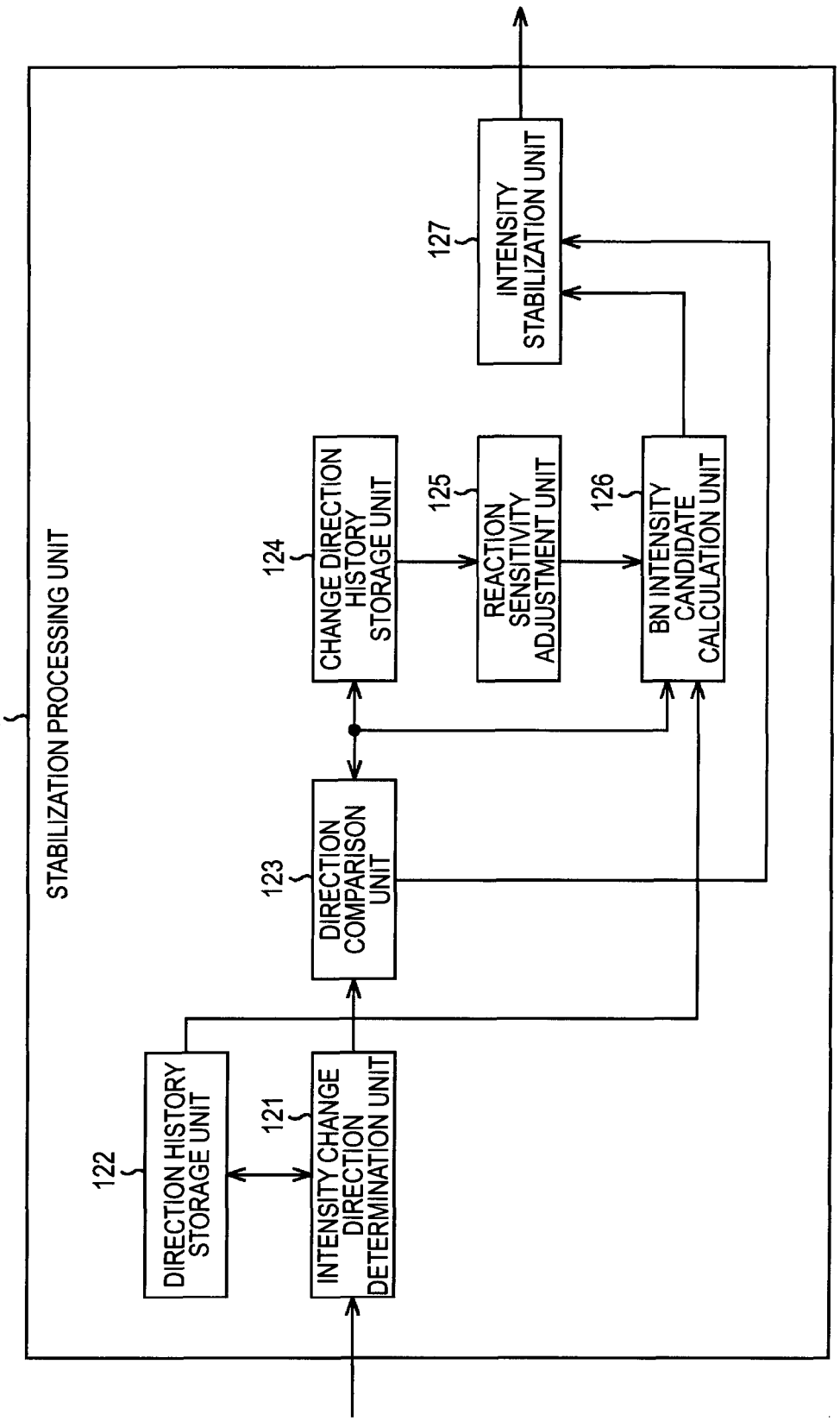
FIG. 5 is a block diagram explaining a configuration example of a stabilization processing unit of FIG. 2.
Figure 25:
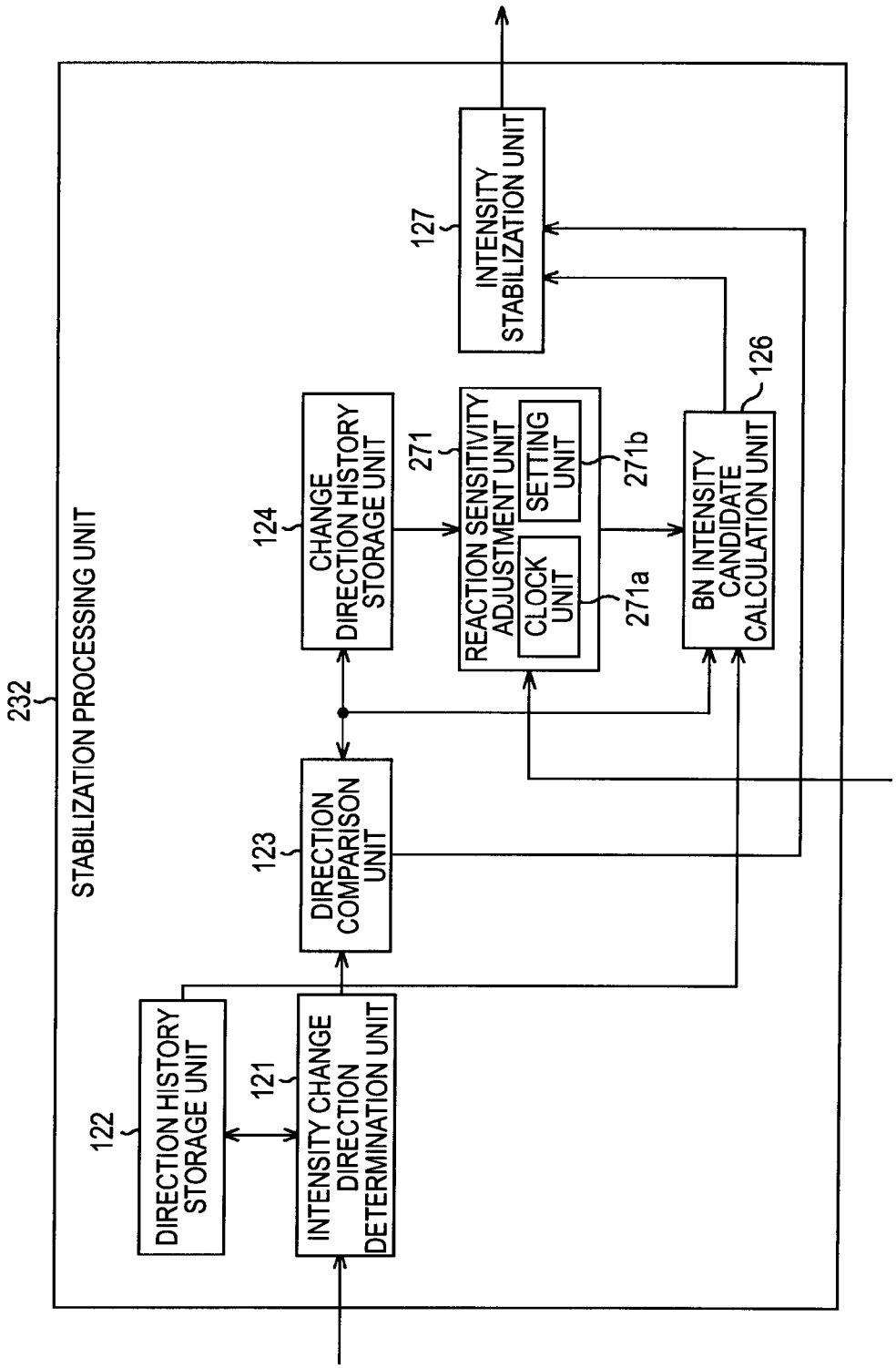
FIG. 25 is a block diagram explaining a configuration example of a stabilization processing unit of FIG. 24.

That is, the stabilization processing unit 232 of FIG. 25 differs from the stabilization unit 34 of FIG. 5 in a point that a reaction sensitivity adjustment unit 271 is provided instead of the reaction sensitivity adjustment unit 125.

The reaction sensitivity adjustment unit 271 includes a clock unit 271a and a setting unit 271b, and adjusts reaction sensitivity (intensity change direction) by changing the value A in the function "core (trans)" shown in FIG. 20 based on information indicating whether scene change has occurred or not supplied from the scene change determination unit 253. More specifically, the clock unit 271a measures a period of time after the information indicating whether scene change has occurred or not supplied from the scene change determination unit 253 is acquired. The setting unit 271b sets reaction sensitivity (intensity change direction) by changing the value A in the function "core (trans)" in accordance with the period of time from the supply of information indicating whether scene change, has occurred or not which has been measured by the clock unit 271a, supplying the sensitivity to the BN intensity candidate calculation unit 126.

Figure 26:
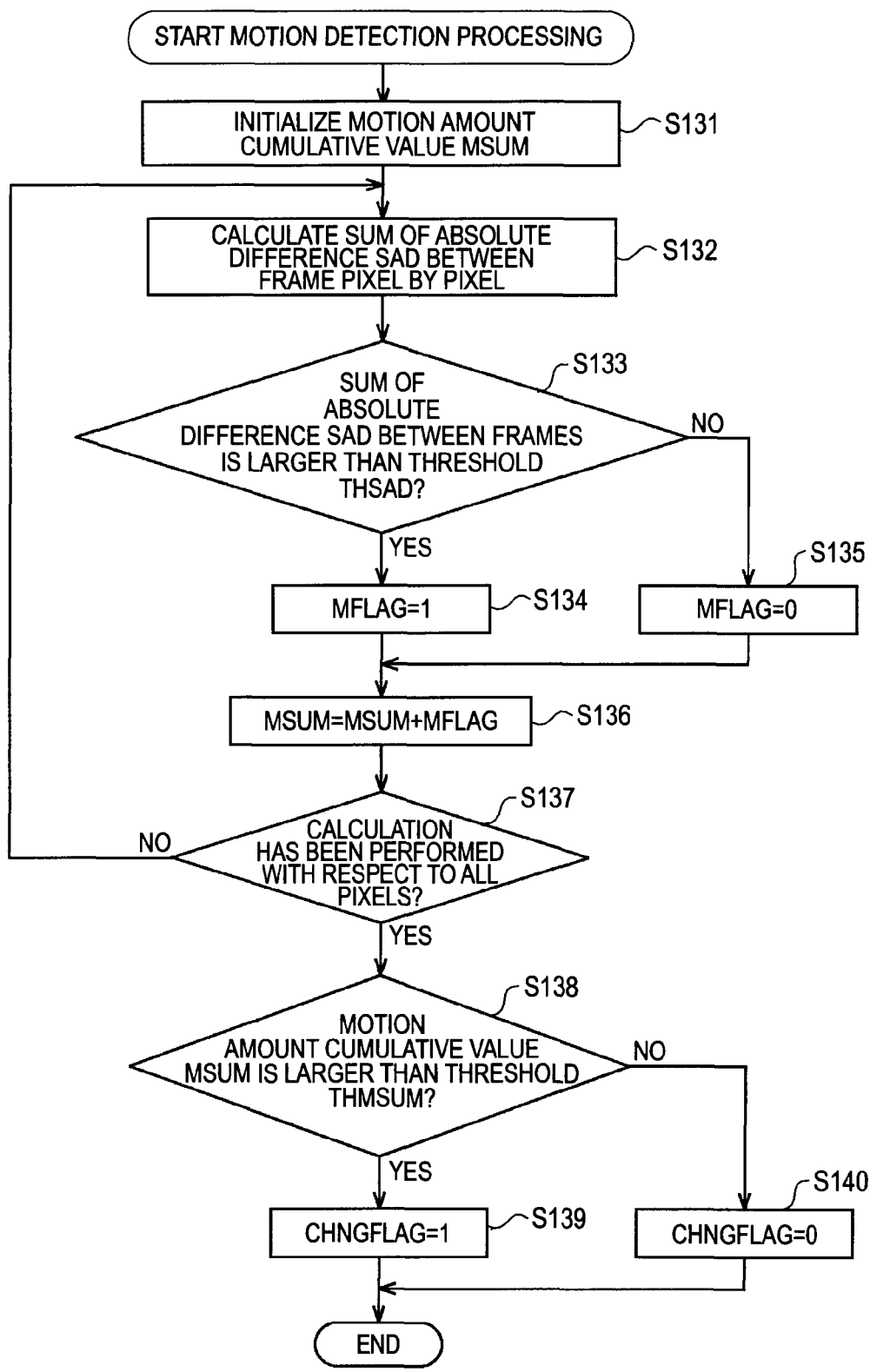
FIG. 26 is a flowchart explaining motion detection processing.

Next, motion detection processing by the motion detection unit 231 will be explained with reference to a flowchart of FIG. 26. The motion detection processing of FIG. 26 is executed frame by frame in the input image.

In Step S131, the motion amount cumulative value calculation unit 252c in the motion amount calculation unit 252 initializes a motion amount cumulative value MSUM stored therein.

In Step S132, the sum of absolute difference calculation unit 252a reads target pixels in the input image and reference pixels corresponding to the target pixels in the immediately preceding image, calculating a sum of absolute differences SAD of pixel values of respective corresponding pixels between frames pixel by pixel. When the pixel value of the target pixels in the input image is C and the pixel value of the reference pixels in the immediately preceding image is P, the sum of absolute differences SAD can be represented as SAD=|P−C|.

In Step S133, the comparison unit 252b determines whether the sum of absolute differences SAD between frames calculated by the sum of absolute difference calculation unit 252a pixel by pixel is larger than a threshold THSAD or not.

When it is determined that the sum of absolute differences SAD between frames is larger than the threshold THSAD in Step S133, the process proceeds to Step S134. In Step S134, the comparison unit 252b sets MFLAG=1 indicating that there is a motion to motion information MFLAG indicating that there is motion with respect to pixels, supplying the MFLAG=1 to the motion amount cumulative value calculation unit 252c.

On the other hand, when it is determined that the sum of absolute differences SAD between frames is not larger than the threshold THSAD in Step S133, the processing proceeds to Step S135. In Step S135, the comparison unit 252b sets MFLAG=0 indicating that there is no motion to motion information MFLAG, supplying the MFLAG=0 to the motion amount cumulative value calculation unit 252c.

In Step S136, the motion amount cumulative value calculation unit 252c newly sets a motion amount cumulative value MSUM obtained by adding the motion information MFLAG from the comparison unit 252b to the motion amount cumulative value MSUM.

In Step S137, the motion amount calculation unit 252 determines whether the motion information MFLAG has been set and the motion amount cumulative value MSUM has been calculated with respect to all pixels included in one frame of the input image.

When it is determined that the motion information MFLAG has been set and the motion amount cumulative value MSUM has not been calculated with respect to all pixels in Step S137, the processing returns to Step S132, and processing of Step S132 to Step S137 is repeated until the calculation is performed with respect to all pixels.

On the other hand, when it is determined that the motion information MFLAG has been set and the motion amount cumulative value MSUM has been calculated with respect to all pixels in Step S137, the motion amount cumulative value calculation unit 252c supplies the motion amount cumulative value MSUM to the scene change determination unit 253. At this time, the motion amount cumulative value MSUM indicates the number of pixels in which there are motions. After Step S137, the processing proceeds to Step S138.

In Step S138, the scene change determination unit 253 determines whether the motion amount cumulative value MSUM supplied from the motion amount cumulative value calculation unit 252c in the motion amount calculation unit 252 is larger than the threshold THMSUM or not.

When it is determined that the motion amount cumulative value MSUM is larger than the threshold THMSUM in Step S138, the process proceeds to Step S139. In Step S139, the scene change determination unit 253 sets CHNGFLAG=1 indicating that scene change has occurred with respect to scene change information CHNGFLAG indicating whether scene change has occurred or not, supplying CHNGFLAG=1 to the stabilization processing unit 232.

On the other hand, when it is determined that the motion amount cumulative value MSUM is not larger than the threshold THMSUM in Step S138, the process proceeds to Step S140. In Step S140, the scene change determination unit 253 sets CHNGFLAG=0 indicating that scene change has not occurred with respect to scene change information CHNGFLAG, supplying CHNGFLAG=0 to the stabilization processing unit 232.

According to the above processing, it is possible to detect scene change based on change of motion amount between the immediately preceding image and the input image.

The method of detecting sharp change of the motion amount between frames, such as in scene change, is not limited to the method explained with reference to the flowchart of FIG. 26 but other methods can be applied.

Figure 27:
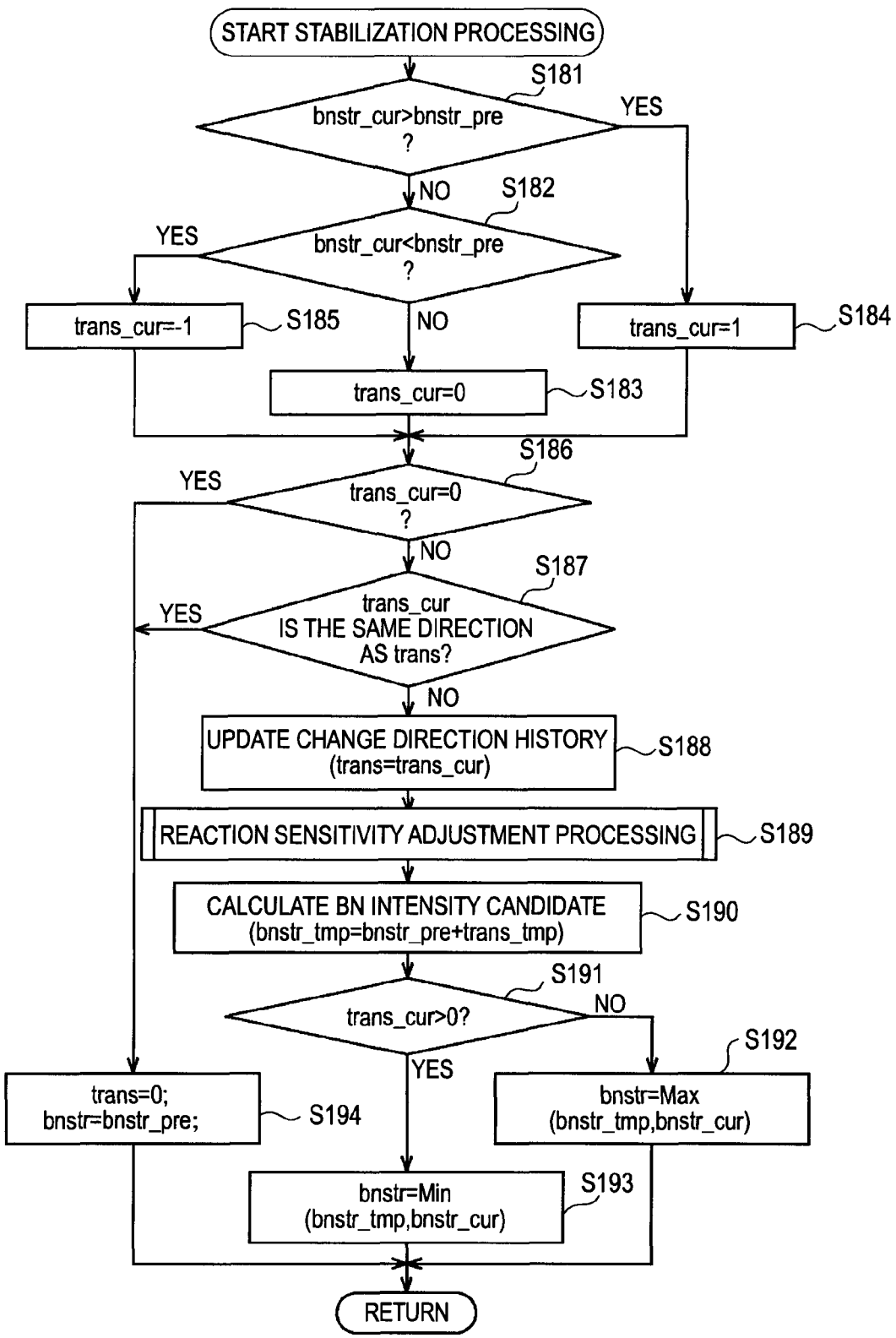
FIG. 27 is a flowchart explaining stabilization processing.

Next, stabilization processing by the stabilization processing unit 232 will be explained with reference to a flowchart of FIG. 27. Note that processing of Step S181 to Step S188 and processing of Step S190 to Step S194 (that is, processing other than Step S189) in the flowchart of FIG. 27 are the same as the processing of Step S81 to S88 and processing of Step S90 to Step S94 explained with reference to the flowchart of FIG. 19, therefore, the explanation thereof is omitted.

That is, in Step S189, the reaction sensitivity adjustment unit 271 in the stabilization processing unit 232 executes reaction sensitivity adjustment processing, adjusting reaction sensitivity (intensity change direction) based on the scene change information CHNGFLAG from the scene change determination unit 253.

Figure 28:
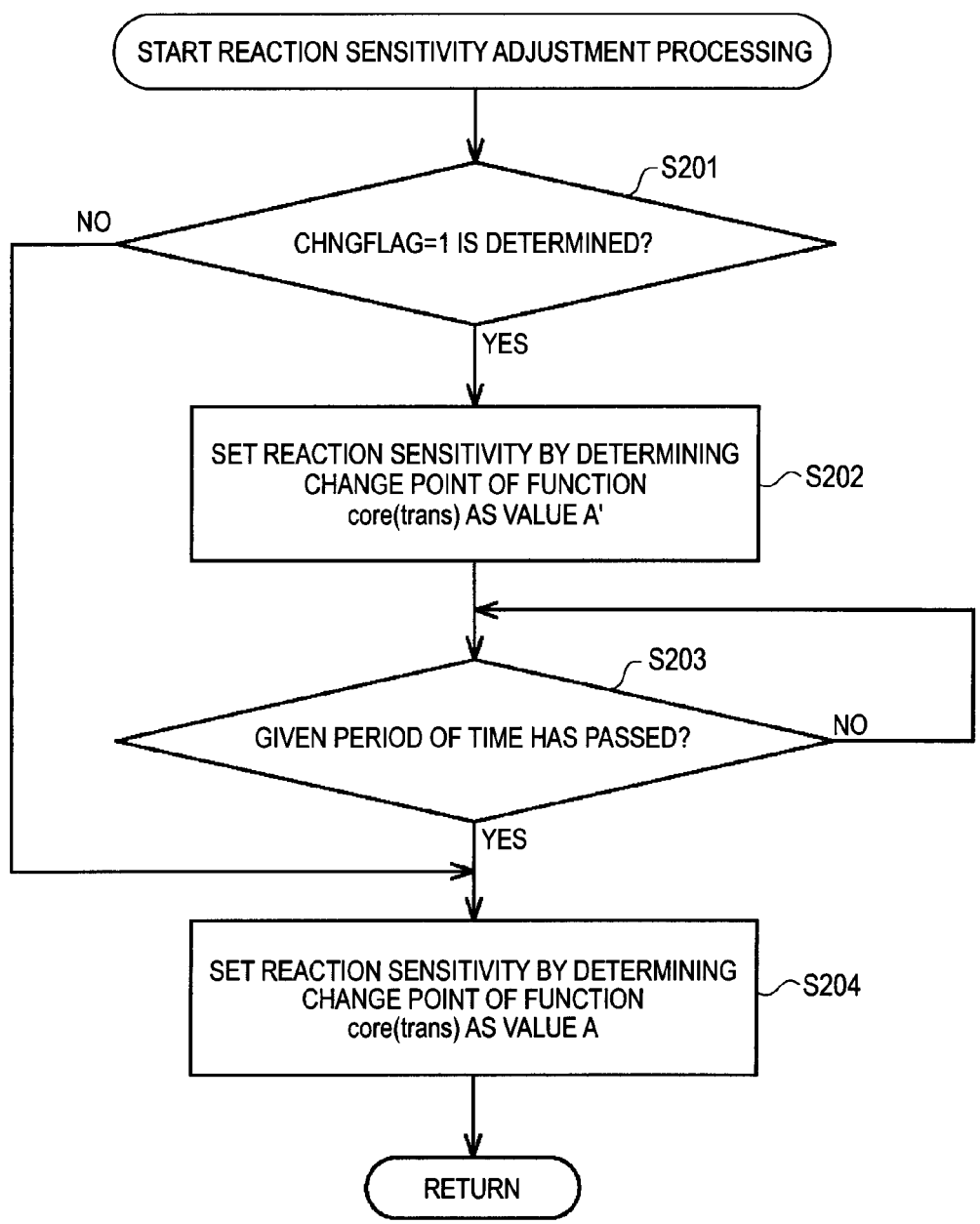
FIG. 28 is a flowchart explaining reaction sensitivity adjustment processing.

Here, the reaction sensitivity adjustment processing by the reaction sensitivity adjustment unit 271 will be explained with reference to a flowchart of FIG. 28.

In Step S201, the reaction sensitivity adjustment unit 271 determines whether the scene change information CHNGFLAG from the scene change determination unit 253 is CHNGFLAG=1 or not in each frame of the input image.

When it is determined that CHNGFLAG=1 in Step S201, that is, the scene change is detected in Step S201, the clock unit 271a starts measuring a period of time from the supply of the scene change information which is CHNGFLAG=1 from the scene change determination unit 253, and the process proceeds to Step S202.

Figure 29:
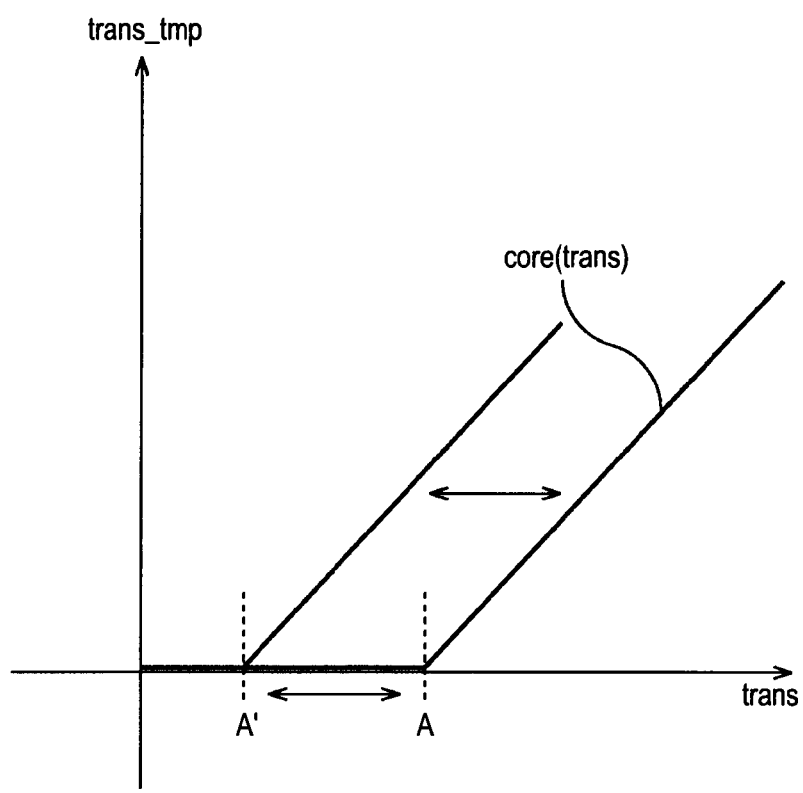
FIG. 29 is a graph explaining reaction sensitivity adjustment processing.

In Step S202, the setting unit 271*b* sets reaction sensitivity (intensity change direction) by determining a change point (value A in FIG. 20) in which the adjusted intensity change direction trans_tmp starts changing (increasing) with respect to the cumulative intensity change direction "trans" in the function "core (trans)" as a value A' as shown in FIG. 29, supplying the sensitivity to the BN intensity candidate calculation unit 126.

As shown in FIG. 29, in Step S202, the entire function "core (trans)" is moved in parallel to the left side (minus direction) by A-A' so that the change point in the function "core (trans)" is moved to the smaller value A' from the value A explained in FIG. 20.

In Step S203, the clock unit 271*a* determines whether a given period of time has passed from the supply of the scene change which is CHNGFLAG=1.

In Step S203, when it is determined that the given period of time has not passed from the supply of the scene change which is CHNGFLAG=1 in Step S203, the processing of Step S203 is repeated until the given period of time has passed.

When it is determined that the given period of time has passed from the supply of the scene change which is CHNG-FLAG=1, the process proceeds to Step S204. In Step S204, the setting unit 271*b* sets reaction sensitivity (intensity change direction) by determining the change point in which the adjusted intensity change direction trans_tmp starts changing (increasing) with respect to the cumulative intensity change direction "trans" in the function "core (trans)" as the value A, supplying the sensitivity to the BN intensity candidate calculation unit 126. In the case where the change point is determined as the value A' in Step S202, the entire function "core (trans)" is moved in parallel to the right side (plus direction) by A-A' so that the change point in the function "core (trans)" will be the value A from the value A' as shown in FIG. 29 in Step S204.

When it is determined that CHNGFLAG is not "1" in Step S201, that is, the scene change is not detected, the process proceeds to Step S204. In this case, the change point in the function "core (trans)" is continuously the value A which has been explained in FIG. 20.

Figure 30:
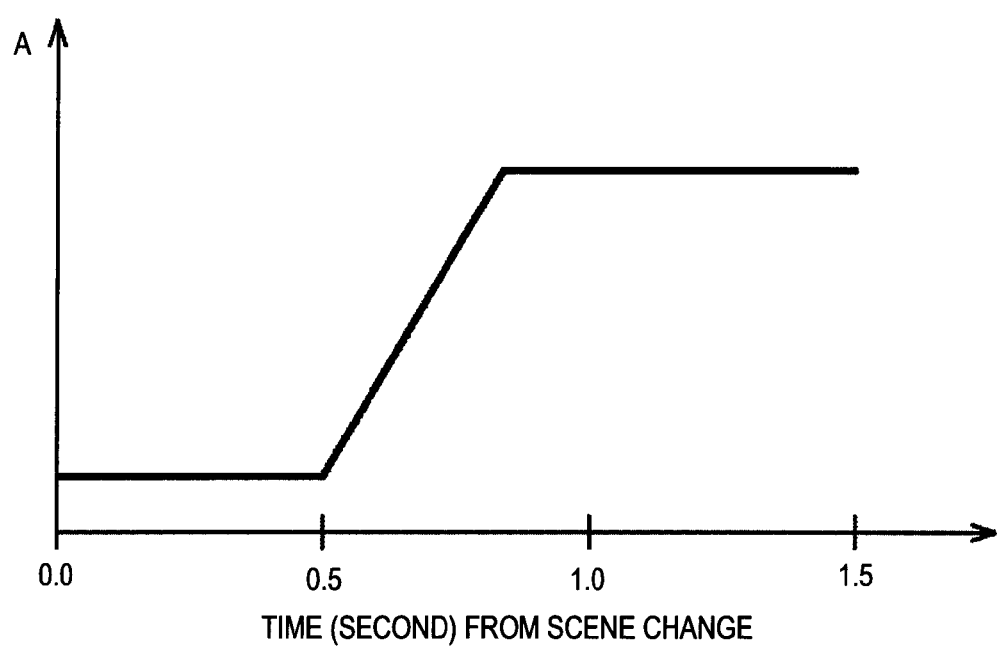
FIG. 30 is a graph explaining reaction sensitivity adjustment processing.

In the above description, when the scene change is detected, the change point in the function "core (trans)" is the value A' from the time point when the scene change is detected to the given time point, and the change point is the value A after the period of time has passed, and more specifically, for example, the relation shown in FIG. 30 can be applied.

In the relation shown in FIG. 30, the value A takes a small value in a period for 0 to 0.5 second from the detection of scene change, and the value A takes larger values after a point of 0.8 second. In a period for 0.5 to 0.8 second, the value A linearly increases from the small value to the larger value, however, it is also preferable that, for example, the value A changes from the small value to the larger value discontinuously at a point of 0.7 second.

For example, image data encoded by the MPEG system includes GOP (Group of Picture) having 12 to 15 frames. The image data encoded by the MPEG system is decoded in 60 fields/second (30 frames/second), therefore, 1 GOP (15 frames) is decoded in 0.5 seconds.

Here, when scene change occurs in a certain GOP, it is desirable to reduce the block noise by increasing reaction sensitivity during processing of the 1 GOP (15 frames).

Therefore, concerning the image data encoded by the MPEG system, the value A is set to the small value in the period for 0 to 0.5 second after the scene change is detected, thereby following the change of block noise intensity within the GOP including frames before and after the scene change. For example, the value A at this time is a value to be reaction sensitivity following the change of block noise intensity, for example, in approximately 0.1 seconds from the detection of the scene change.

After 0.8 seconds has passed from the detection of the scene change, since the block noise intensity varies in a degree explained in FIG. 21, the value A (value A in FIG. 20) is set to the larger value, thereby gently following variation of the block noise intensity. The value A at this time is a value to be reaction sensitivity following the change of block noise intensity in approximately 0.5 seconds in which 1 GOP is decoded.

Figure 31:
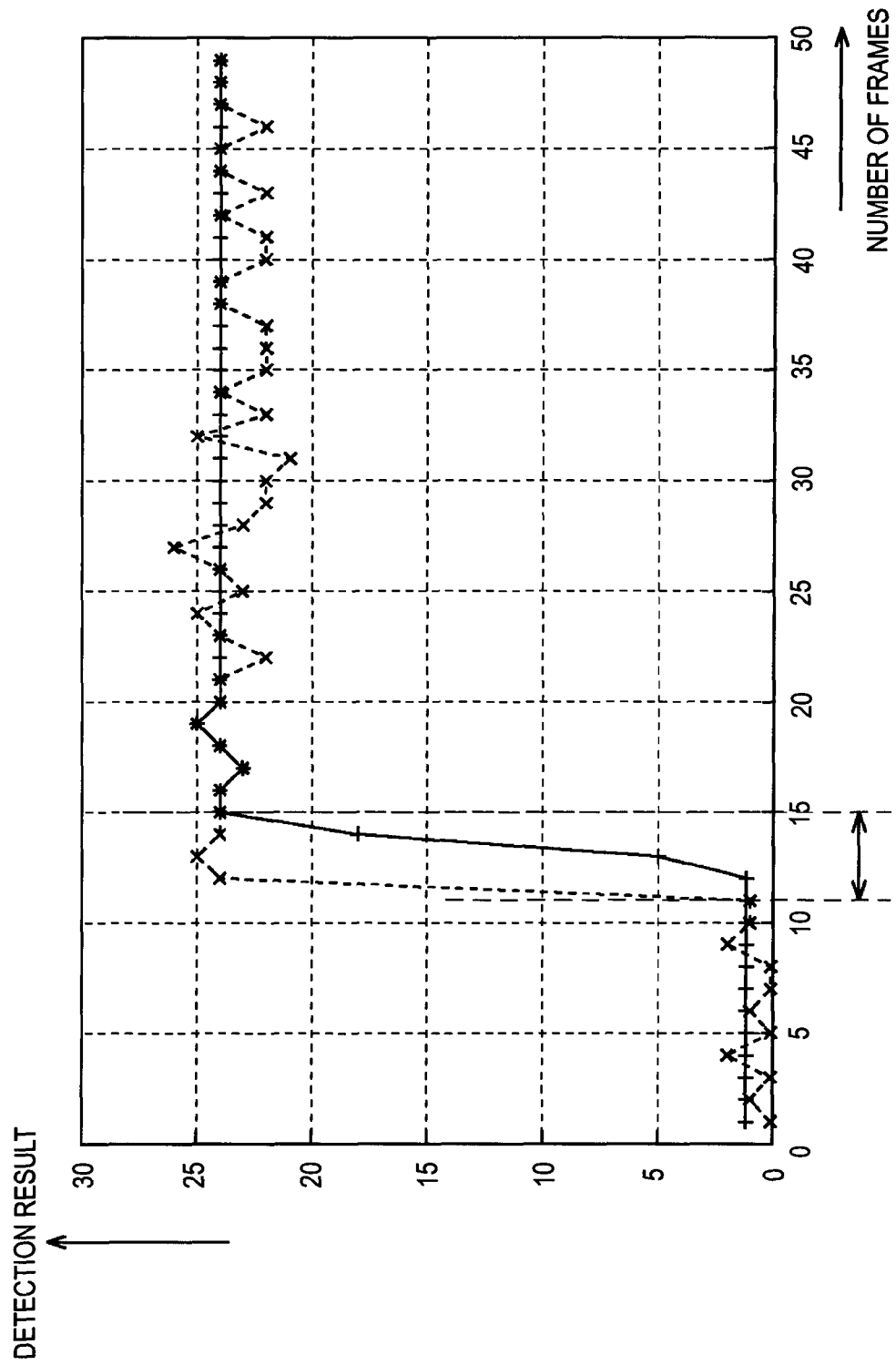
FIG. 31 is a graph explaining stabilization processing when the motion amount sharply changes.

According to the above processing, even when the scene occurs, the result of stabilization follows the block noise intensity as shown in FIG. 31. In FIG. 31, the horizontal axis represents the number of frames and the vertical axis represents the block noise intensity in the same manner as FIG. 23, further, a solid line represents the stabilized block noise intensity and a dotted line represents the block noise intensity in respective frames before stabilization.

In FIG. 31, the scene change has occurred between a frame 10 and a frame 11 in frames before stabilization as explained in FIG. 23. The stabilized block noise intensity changes between the frames 11 to 15 shown by both arrows in the drawing, which follows the block noise intensity before stabilization quickly as compared with the stabilized block noise intensity in FIG. 23. Accordingly, it is possible to reduce the block noise efficiently even when the scene change occurs.

According to the above processing, when the motion amount in the image sharply changes, the block noise intensity can be adjusted quickly so as to follow the change by increasing the reaction sensitivity. When variation of the motion amount is not so large, the block noise intensity can be adjusted so that extremely large change of values does not exist. Therefore, it is possible to reduce the block noise more stably.

In the above explanation, the value A is changed (switched) depending on whether or not scene change has occurred, thereby setting reaction sensitivity of two patterns. It is also preferable set reaction sensitivities of finer patterns by dividing the motion amount between frames into some ranks.

The series of image processing can be executed not only by hardware and but also by software. When the series of processing is executed by software, a computer in which programs included in the software are incorporated in dedicated hardware is used, or programs are installed from a recording medium to a general-purpose personal computer which is capable of executing various functions by installing various programs.

FIG. 32 shows a configuration example of a general-purpose computer. The personal computer includes a CPU (Central Processing Unit) 1001. To the CPU 1001, an input/output interface 1005 is connected through a bus 1004. To the bus 1004, a ROM (Read Only Memory) 1002 and a RAM (Random Access Memory) 1003 are connected.

To the input/output interface 1005, an input unit 1006 including input devices such as a keyboard and a mouse through which a user input operation commands, an output unit 1007 outputting images of a processing operation window and processing results on a display device, a storage unit 1008 including a hard disk drive and the like storing programs or various data and a communication unit 1009 including a LAN (Local Area Network) adaptor and the like, executing communication processing through a network typified by Internet are connected. In addition, a drive 1010 is connected, which reads or writes data with respect to removable media 1011 such as a magnetic disk (including a flexible disk), an optical disk (including a CD-ROM (Compact Disc-Read Only Memory), a DVD (Digital Versatile Disc)), a magneto-optic disc (including a MD (Mini Disc) and a semiconductor memory.

The CPU 1001 executes various processing in accordance with programs stored in the ROM 1002 or programs read from the removable media 1011 such as the magnetic disc, the optical disc, the magneto-optic disc or the semiconductor memory, installed in the storage unit 1008 and loaded from the storage unit 1008 to the RAM 1003. The RAM 1003 stores data appropriately, which is necessary for the CPU 1001 executing various processing.

In the present specification, steps describing the programs recorded in the recording medium include not only processing performed along the described order in time series but also processing performed in parallel or individually, even when the processing is not performed in time series.

The present application contains subject matter related to that disclosed in Japanese Priority Patent Application JP 2009-057940 filed in the Japan Patent Office on Mar. 11, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a level difference calculation means for calculating the difference of pixel values between each pixel and a neighborhood pixel as a level difference;
a classification means for classifying respective pixels into classes in each range of the level difference;
a boundary proportion calculation means for calculating proportion of the number of pixels at a block boundary as a boundary proportion according to the respective classes;
a block noise intensity determination means for determining a level difference of the class in which the boundary proportion is higher than a given threshold and is the maximum value as block noise intensity in the image; and
a stabilization means for correcting and stabilizing block noise intensity in an image including a current target pixel by block noise intensity of a temporally-close pixel when the image belongs to moving pictures.

2. The image processing device according to claim 1, further comprising:
a motion amount calculation means for calculating the motion amount of the image based on the sum of absolute differences in respective pixels between frames of the image,
wherein the stabilization means includes
a reaction sensitivity adjustment means for adjusting reaction sensitivity of intensity change between block noise intensity in the image including the current target pixel and block noise intensity of the temporally-close image, and stabilizes block noise intensity in the image including the current target pixel by the intensity change in which reaction sensitivity has been adjusted by the reaction sensitivity adjustment means and the block noise intensity of the temporally-close image.

3. The image processing device according to claim 2, wherein the reaction sensitivity adjustment means adjusts the reaction sensitivity by a function of adjusting the degree of change in a change direction of the intensity change.

4. The image processing device according to claim 3, wherein the reaction sensitivity adjustment means adjusts the reaction sensitivity to be high for a period from a point when the motion amount calculated by the motion amount calculation means becomes higher than a given value until a given period of time has elapsed.

5. The image processing device according to claim 2, wherein the image belongs to pictures encoded in MPEG (Moving Picture Experts Group) system,
the reaction sensitivity adjustment means adjusts the reaction sensitivity of intensity change in block noise intensity of a frame included in GOP (Group of Pictures) which is a unit of the image in accordance with time necessary for decoding processing of the GOP.

6. The image processing device according to claim 2, wherein the motion amount calculation means determines the number of pixels in which the sum of absolute differences is larger than a given threshold between frames of the image as the motion amount of the image.

7. The image processing device according to claim 1, wherein the level difference calculation means calculates a difference value between absolute difference of pixel values between a target pixel and a reference pixel in the vicinity of the target pixel and absolute difference of pixel values between a neighborhood pixel in the vicinity of the target pixel and a reference pixel in the vicinity of the neighborhood pixel as a difference value of the target pixel, and determines the difference value of the target pixel as level difference of the target pixel when the difference value of the target pixel is larger than a given value.

8. The image processing device according to claim 7, wherein the level difference calculation means further includes
a storage means for storing plural information of difference values of the target pixel, and
when the difference value in the target pixel is the maximum value in plural difference values of the target pixel stored in the storage means, determines the difference value as level difference of the target pixel.

9. The image processing device according to claim 7, wherein the level difference calculation means changes a reference value based on the block size.

10. The image processing device according to claim 1, wherein the boundary proportion calculation means calculates proportion of the number of pixels at a block boundary in the each class in the descending order of corresponding level differences.

11. The image processing device according to claim 10, further comprising:
a total proportion calculation means for calculating proportion in each class with respect to pixels of the whole image as a total proportion,
wherein, when the total proportion is smaller than another given threshold which is lower than the given threshold, the boundary proportion calculation means stops calculation of the total proportion of classes having corresponding level differences larger than the class.

12. An image processing method comprising the steps of:

calculating the difference of pixel values between each pixel and a neighborhood pixel as a level difference;

classifying respective pixels into classes in each range of the level difference;

calculating proportion of the number of pixels at a block boundary as a boundary proportion according to the respective classes;

determining a level difference of the class in which the boundary proportion is higher than a given threshold and is the maximum value as block noise intensity in the image; and correcting and stabilizing block noise intensity in an image including a current target pixel by block noise intensity of a temporally-close pixel when the image belongs to moving pictures.

13. An image processing device comprising:

a level difference calculation unit configured to calculate the difference of pixel values between each pixel and a neighborhood pixel as a level difference;

a classification unit configured to classify respective pixels into classes in each range of the level difference;

a boundary proportion calculation unit configured to calculate proportion of the number of pixels at a block boundary as a boundary proportion according to the respective classes; and a block noise intensity determination unit configured to determine a level difference of the class in which the boundary proportion is higher than a given threshold as well as the maximum value as block noise intensity in the image; and a stabilization unit configured to correct and stabilize block noise intensity in an image including a current target pixel by block noise intensity of a temporally-close pixel when the image belongs to moving pictures.

* * * * *